United States Patent
Gupta et al.

(10) Patent No.: US 12,071,141 B2
(45) Date of Patent: Aug. 27, 2024

(54) SYSTEMS AND METHODS FOR PREDICTING DRIVER VISUAL IMPAIRMENT WITH ARTIFICIAL INTELLIGENCE

(71) Applicant: TOYOTA MOTOR ENGINEERING & MANUFACTURING NORTH AMERICA, INC., Plano, TX (US)

(72) Inventors: Rohit Gupta, Santa Clara, CA (US); Zhouqiao Zhao, Riverside, CA (US); Ziran Wang, San Jose, CA (US); Kyungtae Han, Palo Alto, CA (US); Prashant Tiwari, Santa Clara, CA (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 322 days.

(21) Appl. No.: 17/586,593

(22) Filed: Jan. 27, 2022

(65) Prior Publication Data
US 2023/0234593 A1 Jul. 27, 2023

(51) Int. Cl.
| | |
|---|---|
| B60W 40/09 | (2012.01) |
| B60W 50/16 | (2020.01) |
| B60W 60/00 | (2020.01) |
| G06N 5/04 | (2023.01) |
| G06V 20/59 | (2022.01) |

(Continued)

(52) U.S. Cl.
CPC ............ B60W 40/09 (2013.01); B60W 50/16 (2013.01); B60W 60/0051 (2020.02); G06N 5/04 (2013.01); G06V 20/597 (2022.01); B60W 2040/0818 (2013.01); B60W 2050/143 (2013.01); B60W 2050/146 (2013.01); B60W 2540/221 (2020.02); B60W 2540/225 (2020.02); B60W 2540/229 (2020.02)

(58) Field of Classification Search
CPC .. B60W 40/09; B60W 50/16; B60W 60/0051; B60W 2040/0818; B60W 2050/143; B60W 2050/146; B60W 2540/221; B60W 2540/225; B60W 2540/229; G06N 5/04; G06V 20/597
See application file for complete search history.

(56) References Cited

U.S. PATENT DOCUMENTS

| | | |
|---|---|---|
| 8,704,669 B2 | 4/2014 | Strumolo |
| 9,898,004 B2 | 2/2018 | Mikkelsen |
| 10,213,147 B2 | 2/2019 | Gallagher |

(Continued)

*Primary Examiner* — Mohamed Barakat
(74) *Attorney, Agent, or Firm* — SHEPPARD, MULLIN, RICHTER & HAMPTON LLP; Daniel N. Yannuzzi

(57) ABSTRACT

Systems and methods are provided for predictive assessment of driver perception abilities based on driving behavior personalized to the driver in connection with, but not necessarily, autonomous and semi-autonomous vehicles. In accordance with on embodiment, a method comprises receiving first vehicle operating data and associated first gaze data of a driver operating a vehicle; training a model for the driver based on the first vehicle operating data and the first gaze data, the model indicating driving behavior of the driver; receiving second vehicle operating data and associated second gaze data of the driver; and determining that an ability of the driver to perceive hazards is impaired based on applying the model to the second vehicle operating data and associated second gaze data.

20 Claims, 10 Drawing Sheets

(51) Int. Cl.
 *B60W 40/08* (2012.01)
 *B60W 50/14* (2020.01)

(56) References Cited

U.S. PATENT DOCUMENTS

| | | |
|---|---|---|
| 11,392,131 B2* | 7/2022 | Satzoda ............... G05D 1/0221 |
| 2015/0116493 A1* | 4/2015 | Bala ..................... G06V 20/597 |
| | | 348/148 |
| 2020/0101981 A1 | 4/2020 | Phillips |
| 2020/0207358 A1* | 7/2020 | Katz .................. G02B 27/0093 |
| 2022/0126837 A1* | 4/2022 | Croxford .............. B60W 50/16 |
| 2022/0129686 A1* | 4/2022 | Lee ....................... B60W 40/08 |
| 2022/0188851 A1* | 6/2022 | Zhou ......................... G06N 7/01 |
| 2022/0300072 A1* | 9/2022 | Arar .................... G06F 18/2148 |

\* cited by examiner

SYSTEMS AND METHODS FOR PREDICTING DRIVER VISUAL IMPAIRMENT WITH ARTIFICIAL INTELLIGENCE

TECHNICAL FIELD

The present disclosure relates generally to vehicles, and in particular, some implementations relate to predictive assessment of driver perception abilities based on driving behavior personalized to the driver.

DESCRIPTION OF RELATED ART

Timely perception of hazards by a driver, while operating a vehicle, is a key driving skill. Such skills assist in reducing accident occurrence and improve safety for the driver and surrounding drivers and persons. However, hazard perception of drivers with eye diseases, changes in eye sight, and other related ocular changes, as well as visual predictors of hazard perception are not well understood.

Assessments of drivers' hazard perception during open-road conditions is a challenge due to the variability in the number and nature of potential hazards, for example, due to differences in traffic conditions from one assessment to another. One approach has been to assess hazard perception ability under controlled laboratory-based conditions. This approach involves presentation of a series of video clips of traffic conditions that contain a range of traffic hazards, which are presented to people within a laboratory setting. Hazard perception of the subjects is then assessed from the ability of the subject to anticipate and respond to potentially dangerous situations from the presentations. However, this approach is based on laboratory data, which is often different than real life data, for example, given that subjects subconsciously know they are not in any real danger, etc.

BRIEF SUMMARY OF THE DISCLOSURE

According to various embodiments of the disclosed technology provide for systems and methods for predictive assessment of driver perception abilities based on driving behavior personalized to the driver.

In accordance with some embodiments, a method is provided that comprises receiving first vehicle operating data and associated first gaze data of a driver operating a vehicle; training a model for the driver based on the first vehicle operating data and the first gaze data, the model indicating driving behavior of the driver; receiving second vehicle operating data and associated second gaze data of the driver; and determining that an ability of the driver to perceive hazards is impaired based on applying the model to the second vehicle operating data and associated second gaze data.

In another aspect, a system is provided that comprises a memory and one or more processors that are configured to execute machine readable instructions stored in the memory for performing a method. The method comprises receiving historical vehicle operating data and associated historical gaze data of a driver operating a vehicle; learning a reward function based on application of inverse reinforcement learning (IRL) to the historical vehicle operating data and the historical environmental; calculating a cumulative reward from the reward function based on real-time vehicle operating data and associated real-time gaze data of the driver; and determining that an ability of the driver to perceive hazards is impaired based on the cumulative reward.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
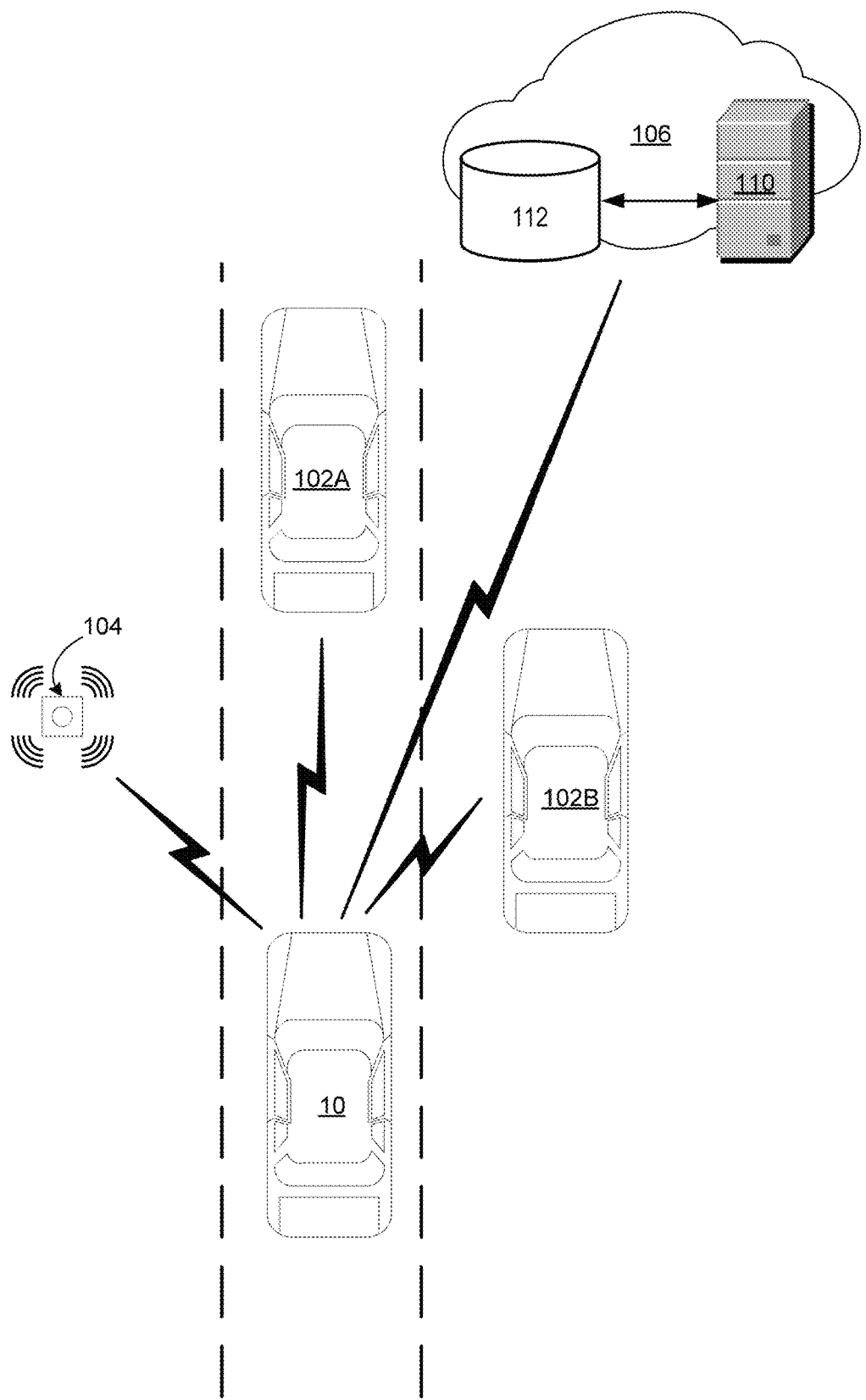
FIG. 1 illustrates an example predictive perception assessment system communicably coupled to one or more vehicles in accordance with various embodiments disclosed herein.

The figures are not exhaustive and do not limit the present disclosure to the precise form disclosed.

DETAILED DESCRIPTION

Embodiments of the systems and methods disclosed herein can provide for predictive assessment of perception ability while operating a vehicle. Embodiments herein can predict vision impairment in drivers, compensate for temporary and early impairments, and, thus, avoid accidents and increase safety for surrounding drivers through warnings and autonomous/semi-autonomous vehicle control.

Embodiments of the predictive assessment may be applicable to various use cases. For example, embodiments herein can be used for recognizing changes in the drivers perception ability over time; detecting potential infectious disease breakout; and predicting temporary, non-disease or degeneration perception impairment.

The ability to perceive hazards and to anticipate potential road hazards to avoid a collision(s) is an important factor in driving safety. For example, older drivers with eye disease or other visually impairments may be less capable of or may not be able to operative a vehicle as safely as drivers with normal or non-impaired vision. Drivers with eye disease and associated visual impairment may also experience reduced hazard perception. Additionally, drivers with age-related macular degeneration (AMD) (e.g., presbyopia, floaters, keratoconjunctivitis sicca, cataracts, glaucoma, to name of few) may make more observational errors than drivers without the symptoms, whereas drivers with binocular field loss (primarily from glaucoma) had impaired anticipation skills. Drivers with mild to moderate glaucomatous loss may be more likely to have difficulties with detection of peripheral obstacles, hazards, and unexpected events, compared to controls.

Conventionally, as described above, assessment of drivers' hazard perception during open-road conditions is a challenge. Some approaches rely on controlled laboratory-based conditions with a presentation of video clips involving traffic, and assess the ability of subjects to anticipate and respond to potentially dangerous situations on the road. However, this approach is based on lab data which often is different than real life data, and not all drivers are the same as the assessed subjects.

Accordingly, embodiments herein utilize real, historical vehicle-related data to learn driving behavior and driving style of a driver. The learned behavior and style is then used to assess a driver's hazard perception ability under consideration of current situations (e.g. determined from real-time vehicle-related data). Thus, embodiments disclosed herein learn features of personal driving behavior of respective drivers and identify current actions that deviate from the behavior. According to various embodiments herein, the personal driving behavior can be learned by applying artificial intelligence (AI) and machine learning (ML) techniques certain vehicle-related data that represents a historical driving and visual behavior in terms of driving conditions, from which a digital twin model can be recovered (e.g., a representation of the drivers personal driving behaviors and styles). For example, inverse reinforcement learning (IRL) methods may be applied to recover a reward function (e.g., referred to herein as a digital twin model) from past or historical driving data (e.g., past observations). Additionally, embodiments herein utilize eye tracking of in-cabin sensors to quantify the eye and head detections as states, which are feed into IRL for recovering the reward function. Embodiments herein may apply the digital twin model to a current observation to identify a potential impairment and differentiate between a changed perception ability and a temporary distraction.

The systems and methods disclosed herein may address the problem of drivers with visual impairment who may not be aware of such impairment and/or may consider the impairment to be a minor nuisance and exaggerate their driving skills to compensate for the impairment. The application of AI techniques to learn the driver's driving preferences and styles, provides for the ability identify whether the driver is truly affected by his/her hazard perception ability, or simply gets distracted while driving.

In some embodiments, the systems and methods disclosed herein may be used to control (operate and guide) a vehicle to safety, for example, when the driver is distracted or his/her ability to perceive hazards is impaired to a degree that it would be dangerous to the driver and others to continue to operate the vehicle. For example, the AI techniques disclosed herein may detect distraction and/or impairment and then activate autonomous or semi-autonomous control of the vehicle to perform automated (e.g., without driver input) control to a safe location to stop the vehicle.

It should be noted that the terms "optimize," "optimal" and the like as used herein can be used to mean making or achieving performance as effective or perfect as possible. However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters It should be noted that the terms "approximately" and "about" used throughout this disclosure, including the claims, are used to describe and account for small deviations. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%

FIG. 1 illustrates an example predictive perception assessment system communicably coupled to a vehicle in accordance with various embodiments disclosed herein. A vehicle 10 may have one or more sensors (not shown in FIG. 1), e.g., vehicle operating conditions, external sensors, in-cabin sensors, and the like. For example, vehicle 10 may have proximity sensors that can gather data regarding nearby objects or other vehicles, e.g., vehicles 102A and 102B. Vehicle 10 may have in-cabin sensors that can gather data related to conditions, such as occupants, in-side the vehicle 10. Vehicle operating condition sensors can gather data regarding vehicle states of operation and conditions. Data collected by these sensors may be referred to as "vehicle-related data."

According to various embodiments, vehicle 10 can be an autonomous vehicle. As used herein, "autonomous vehicle" can refer to a vehicle that is configured to operate in an autonomous operational mode. "Autonomous operational mode" can refer to the use of one or more computing systems of the vehicle 10 to navigate and/or maneuver vehicle 10 along a travel route with a level of input from a human driver which can vary with the operational mode. As such, vehicle 10 can have a plurality of autonomous operational modes. In some embodiments, vehicle 10 can have an unmonitored autonomous operational mode, meaning that one or more computing systems are used to maneuver vehicle 10 along a travel route fully autonomously, requiring no input or supervision required from a human driver.

Alternatively, or in addition to the above-described modes, vehicle 10 can have one or more semi-autonomous operational modes. "Semi-autonomous operational mode" can refer to a mode whereby a portion of the navigation and/or maneuvering of vehicle 10 along a travel route is performed by one or more computing systems, and a portion of the navigation and/or maneuvering of vehicle 10 along a travel route is performed by a human driver. One example of a semi-autonomous operational mode is when an adaptive cruise control system is activated. In such case, the speed of vehicle 10 can be automatically adjusted to maintain a safe distance from a vehicle ahead based on data received from on-board sensors, but vehicle 10 is otherwise operated manually by a human driver. Upon receiving a driver input to alter the speed of the vehicle (e.g. by depressing the brake pedal to reduce the speed of the vehicle 10), the adaptive cruise control system is deactivated, and the speed of the vehicle is reduced. Other semi-autonomous operational modes, which may be implemented alone or in combination (e.g., with other operational modes including adaptive cruise control), may include, but not limited to, a lane-keeping operational mode, automated navigation, and the like.

In some implementations, to achieve the above-described modes of operation (or other manner of operating or utilizing vehicle 10), AI and/or machine ML systems and methods may be used to predict or implement operational commands or instructions, e.g., from an electronic control unit (ECU) of vehicle 10. Such AI or ML systems may rely on models trained using data from vehicle 10 (or other vehicles), for example, vehicle-related data, external environmental data, and/or in-cabin data.

As referred to herein, AI can be described as an automated computer process(es) that can intelligently leverage data analysis for training itself for further optimizing the processes. ML can be generally considered an application of AI. AI techniques can include various approaches that are used in the area to achieve automated data analysis, such as neural, automated reasoning analysis (e.g., satisfiability modulo theories), reinforcement learning (RL), IRL, and so on. AI-based techniques can be used to enhance computer-controlled features of vehicles in a manner that improves driving safety (e.g., a reduction of potential crashes), provides uniform traffic flow (e.g., slows a traveling speed), directs vehicles away from an accident or other road hazard (e.g., change lanes or enter a high occupancy vehicle (HOV) lane away from a road hazard), and optimizes driving performance of vehicles (e.g., fuel efficiency) for a practical application and/or operational environment, as noted above.

Vehicle 10 may further have vehicle-to-everything (V2X) communications capabilities, allowing vehicle 10 to communicate with a roadside unit/equipment (RSU/RSE) or other roadside infrastructure, such as RSU 104 (which may be a vehicle-to-infrastructure (V2I)-enabled street light or cameras, for example). Vehicle 10 may also communicate with other vehicles, e.g., vehicles 102A and 102B, over vehicle-to-vehicle (V2V) communications. It should be understood that sometimes, a vehicle itself may act as a network node or edge computing device. For example, vehicle 102B may be a network edge device. The data gathered by vehicle 10, either through its own sensors, or other data sources, e.g., RSU 104 and vehicles 102A and 102B, may be ultimately be transmitted to a network edge device, such as the cloud, e.g., a cloud server 110 and cloud-based database 112 resident on network 106.

Cloud server 110 may be any computational server, such as a server utilizing AI systems and/or methods to model and predict vehicle responses, autonomous vehicle operation, predictive navigation, and so on. Cloud server 110 may refer to one or more cloud-based instances of servers resident on network 105. As alluded to above, vehicle 102 may include an electronic control unit 50. Cloud server 110 may include circuitry to control various aspects of the predictive perception assessment system described herein. Cloud server 110 may include, for example, a microcomputer that includes a one or more processing units (e.g., microprocessors), memory storage (e.g., RAM, ROM, etc.), and I/O devices. The processing units of cloud server 110, execute instructions stored in memory to execute and control functions of the predictive perception assessment system, for example, as described below in connection with FIGS. 5-9.

For example, vehicle 10 may receive vehicle related information/data suggesting the vehicle 10 is slowing down, e.g., a brake pedal sensor detecting pressing of a brake and/or acceleration pedal sensor detecting a release of the accelerator pedal. Vehicle 10 may receive information indicating a deceleration rate, e.g., acceleration sensor. Vehicle 10 may also be receiving external environmental condition information suggesting vehicle 102A in leading vehicle 10 and vehicle 102B is next to vehicle 10, e.g., a proximity sensor, range detecting sensors, and/or image sensors. Additionally, vehicle 102A and vehicle 102B may transmit V2V communications data indicating that they too are slowing down what may indicate traffic congestion along the traveling route, while RSU 104 transmits V2I communications data indicating traffic conditions within its sensed region, e.g., congested, light, traffic hazards (e.g., objects on road, pedestrians, accidents, etc.). As another example, vehicle 10 may be receiving vehicle-related information suggesting operator of vehicle 10 is steering, e.g., steering wheel sensor, wheel angle sensor, and/or in-cabin sensors, for example, detecting operation of a steering wheel. Additionally, vehicle 102A and vehicle 102B may transmit V2V communications data indicating that vehicle 10 is steering (e.g., external environment sensors of vehicles 102A and 102B that detect vehicle 10), while RSU 104 transmits V2I communications data tracking movement by vehicle 10. Additionally, vehicle 10 may be receiving in-cabin information of occupants in the cabin of vehicle 10. For example, in-cabin sensors may gather data (e.g., image frames where in-cabin sensors are cameras) from which eye tracking and head tracking of one or more occupants, such as the driver and/or passengers, may be performed. Vehicle 10 may gather the vehicle-related information and communicate the information (or data) to cloud server 110 for storage in cloud-based database 112 via network 106. Cloud-based database 112 may consist of one or more databases or database instances that are resident on network 105.

As alluded to above, cloud server 110 may utilize artificial intelligence systems and/or methods to model and predict vehicle responses, autonomous vehicle operation, predictive navigation, and so on. In various embodiments, cloud server 110 may apply AI techniques to data received from vehicle 10, to teach a digital twin model corresponding to the driver of vehicle 10. The digital twin model is representative of the drivers real driving style and behaviors (e.g., how the driver would respond when faced with certain environmental conditions and vehicle state). For example, using received vehicle-related data as observed demonstrations, AI techniques (such as IRL, for example) can be applied to infer a reward function indicative of the driver's personal driving style and behavior. The learned model can be communicated to the vehicle 10 and used to perform autonomous and/or semi-autonomous operation of vehicle 10. For example, a current observed demonstration (e.g., most recent vehicle-related data) may be input into the model to infer vehicle operating inputs to operate the vehicle in a manner that optimally or nearly optimally mimics the drivers personal driving style and behavior.

Embodiments herein, may also apply the AI techniques to in-cabin data, such as eye tracking data and head tracking data. The in-cabin data may be used to learn a occupants in-cabin behavior during vehicle operation, for example, through an association of in-cabin data to other vehicle-related data collected during a common time window. Through the association between in-cabin data, external environmental conditions, and vehicle-related data, the AI techniques can be applied to teach the digital twin model to infer occupant behavior for an observed current demonstration. The digital twin model may then be used to calculated expected (e.g., inferred) behavior from current observations. The inferred behavior may then be used to assess whether the occupants current behavior aligns or nearly aligns with the expected behavior given the current observed demonstration. For example, the digital twin model may be used to calculate eye and head status of the driver that is expected for a certain observed demonstration. If the current demonstration indicates that the driver's eyes and head are not in the expect state (e.g., looking away from the moving direction, closed, etc.), embodiments herein may issue a warning or other notification to the driver and/or external systems. In some embodiments, semi-autonomous or autonomous operational modes may be activated (e.g., adaptive cruise control, lane-keeping systems, and the like) may be activated in response to the assessment, such that the semi-operational mode takes vehicle control from the driver until the impairment passes. Thereby, ensuring the vehicle is operated safely under the current observed demonstrations, for example, in the event that the drivers ability to preserve hazards or obstacles is affected.

For purposes of illustration, embodiments are described herein with respect to automobiles. However, it should be appreciated that the AI techniques disclosed herein are not limited to automobiles. The systems and methods disclosed herein may be implemented with any of a number of different vehicles and vehicle types. For example, the AI systems and methods disclosed herein may be used with automobiles, trucks, motorcycles, boats, recreational vehicles, and other on-road or off-road vehicles. In addition, the principals disclosed herein may also extend to other vehicle types as well.

Figure 2:
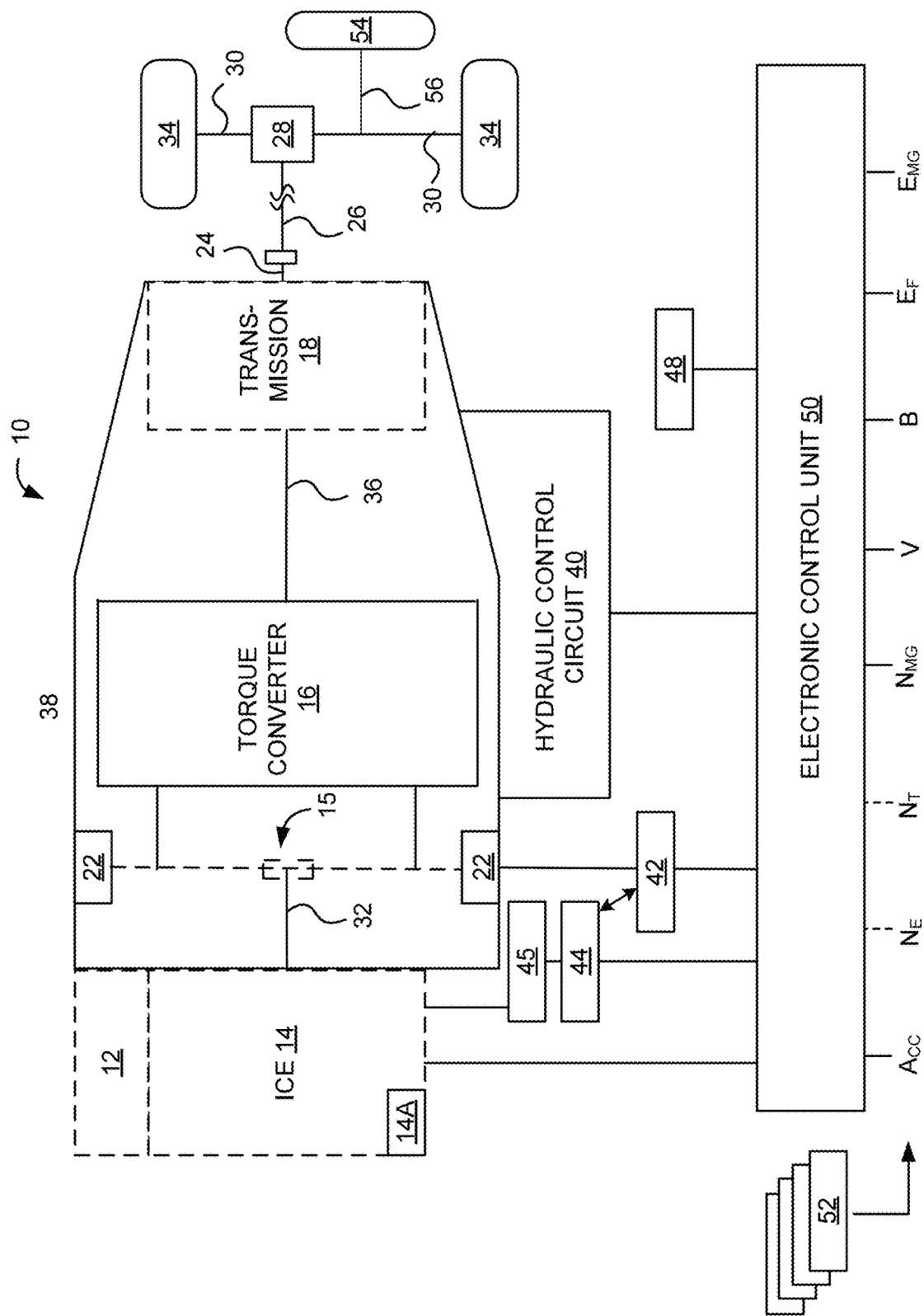
FIG. 2 is a schematic representation of an example vehicle with which embodiments of the predictive perception assessment systems and methods disclosed herein may be implemented.

The systems and methods disclosed herein may be implemented with any of a number of different vehicles and vehicle types. For example, the systems and methods disclosed herein may be used with automobiles, trucks, motorcycles, recreational vehicles, boats, and other like on- or off-road vehicles. In addition, the principals disclosed herein may also extend to other vehicle types as well. An example hybrid electric vehicle (HEV) in which embodiments of the disclosed technology may be implemented is illustrated in FIG. 2. Although the example described with reference to FIG. 2 is a hybrid type of vehicle, the systems and methods for predictive perception assessment can be implemented in other types of vehicle including gasoline- or diesel-powered vehicles, fuel-cell vehicles, electric vehicles, or other vehicles.

FIG. 2 illustrates a drive system of a vehicle 10 that may include an internal combustion engine 14 and one or more electric motors 22 (which may also serve as generators) as sources of motive power. Driving force generated by the internal combustion engine 14 and motors 22 can be transmitted to one or more wheels 34 via a torque converter 16, a transmission 18, a differential gear device 28, and a pair of axles 30. Direction of travel of the vehicle (e.g., a moving direction or heading) may be based on the angle of the one or more wheels 34, which can be controlled by steering wheel 54. Rotation of steering wheel 54 may be transmitted to axles 30 by steering column 56 coupled to the axles 30 so to convert rotational motion of the steering wheel into translational motion of the axles (e.g., a rack and pinion steering or the like). Translational motion of the axles 30 is transferred to the wheels to change the wheel angle in accordance with the rotation of the steering wheel 54.

As an HEV, vehicle 2 may be driven/powered with either or both of engine 14 and the motor(s) 22 as the drive source for travel. For example, a first travel mode may be an engine-only travel mode that only uses internal combustion engine 14 as the source of motive power. A second travel mode may be an EV travel mode that only uses the motor(s) 22 as the source of motive power. A third travel mode may be an HEV travel mode that uses engine 14 and the motor(s) 22 as the sources of motive power. In the engine-only and HEV travel modes, vehicle 10 relies on the motive force generated at least by internal combustion engine 14, and a clutch 15 may be included to engage engine 14. In the EV travel mode, vehicle 2 is powered by the motive force generated by motor 22 while engine 14 may be stopped and clutch 15 disengaged.

Engine 14 can be an internal combustion engine such as a gasoline, diesel or similarly powered engine in which fuel is injected into and combusted in a combustion chamber. A cooling system 12 can be provided to cool the engine 14 such as, for example, by removing excess heat from engine 14. For example, cooling system 12 can be implemented to include a radiator, a water pump and a series of cooling channels. In operation, the water pump circulates coolant through the engine 14 to absorb excess heat from the engine. The heated coolant is circulated through the radiator to remove heat from the coolant, and the cold coolant can then be recirculated through the engine. A fan may also be included to increase the cooling capacity of the radiator. The water pump, and in some instances the fan, may operate via a direct or indirect coupling to the driveshaft of engine 14. In other applications, either or both the water pump and the fan may be operated by electric current such as from battery 44.

An output control circuit 14A may be provided to control drive (output torque) of engine 14. Output control circuit 14A may include a throttle actuator to control an electronic throttle valve that controls fuel injection, an ignition device that controls ignition timing, and the like. Output control circuit 14A may execute output control of engine 14 according to a command control signal(s) supplied from an electronic control unit 50, described below. Such output control can include, for example, throttle control, fuel injection control, and ignition timing control.

Motor 22 can also be used to provide motive power in vehicle 2 and is powered electrically via a battery 44. Battery 44 may be implemented as one or more batteries or other power storage devices including, for example, lead-acid batteries, lithium ion batteries, capacitive storage devices, and so on. Battery 44 may be charged by a battery charger 45 that receives energy from internal combustion engine 14. For example, an alternator or generator may be coupled directly or indirectly to a drive shaft of internal combustion engine 14 to generate an electrical current as a result of the operation of internal combustion engine 14. A clutch can be included to engage/disengage the battery charger 45. Battery 44 may also be charged by motor 22 such as, for example, by regenerative braking or by coasting during which time motor 22 operate as generator.

Motor 22 can be powered by battery 44 to generate a motive force to move the vehicle and adjust vehicle speed. Motor 22 can also function as a generator to generate electrical power such as, for example, when coasting or braking. Battery 44 may also be used to power other electrical or electronic systems in the vehicle. Motor 22 may be connected to battery 44 via an inverter 42. Battery 44 can include, for example, one or more batteries, capacitive storage units, or other storage reservoirs suitable for storing electrical energy that can be used to power motor 22. When battery 44 is implemented using one or more batteries, the batteries can include, for example, nickel metal hydride batteries, lithium ion batteries, lead acid batteries, nickel cadmium batteries, lithium ion polymer batteries, and other types of batteries.

An electronic control unit (ECU) 50 (described below) may be included and may control the electric drive components of the vehicle as well as other vehicle components. For example, electronic control unit 50 may control inverter 42, adjust driving current supplied to motor 22, and adjust the current received from motor 22 during regenerative coasting and breaking. As a more particular example, output torque of the motor 22 can be increased or decreased by electronic control unit 50 through the inverter 42.

A torque converter 16 can be included to control the application of power from engine 14 and motor 22 to transmission 18. Torque converter 16 can include a viscous fluid coupling that transfers rotational power from the motive power source to the driveshaft via the transmission. Torque converter 16 can include a conventional torque converter or a lockup torque converter. In other embodiments, a mechanical clutch can be used in place of torque converter 16.

Clutch 15 can be included to engage and disengage engine 14 from the drivetrain of the vehicle. In the illustrated example, a crankshaft 32, which is an output member of engine 14, may be selectively coupled to the motor 22 and torque converter 16 via clutch 15. Clutch 15 can be implemented as, for example, a multiple disc type hydraulic frictional engagement device whose engagement is controlled by an actuator such as a hydraulic actuator. Clutch 15 may be controlled such that its engagement state is complete engagement, slip engagement, and complete disengagement complete disengagement, depending on the pressure applied to the clutch. For example, a torque capacity of clutch 15 may be controlled according to the hydraulic pressure supplied from a hydraulic control circuit (not illustrated). When clutch 15 is engaged, power transmission is provided in the power transmission path between the crankshaft 32 and torque converter 16. On the other hand, when clutch 15 is disengaged, motive power from engine 14 is not delivered to the torque converter 16. In a slip engagement state, clutch 15 is engaged, and motive power is provided to torque converter 16 according to a torque capacity (transmission torque) of the clutch 15.

As alluded to above, vehicle 102 may include an electronic control unit 50. Electronic control unit 50 may include circuitry to control various aspects of the vehicle operation. Electronic control unit 50 may include, for example, a microcomputer that includes a one or more processing units (e.g., microprocessors), memory storage (e.g., RAM, ROM, etc.), and I/O devices. The processing units of electronic control unit 50, execute instructions stored in memory to control one or more electrical systems or subsystems in the vehicle. Electronic control unit 50 can include a plurality of electronic control units such as, for example, an electronic engine control module, a powertrain control module, a transmission control module, a suspension control module, a body control module, and so on. As a further example, electronic control units can be included to control systems and functions such as doors and door locking, lighting, human-machine interfaces, cruise control, telematics, braking systems (e.g., ABS or ESC), battery management systems, and so on. These various control units can be implemented using two or more separate electronic control units, or using a single electronic control unit.

In the example illustrated in FIG. 1, electronic control unit 50 receives information from a plurality of sensors included in vehicle 102. For example, electronic control unit 50 may receive signals that indicate vehicle in-vehicle operating conditions or characteristics, or signals that can be used to derive vehicle operating conditions or characteristics. These may include, but are not limited, to accelerator operation amount ($A_{CC}$), a revolution speed ($N_E$) of internal combustion engine 14 (engine RPM), a rotational speed of the motor 22 (motor rotational speed), and vehicle speed (NV). These may also include torque converter 16 output ($N_T$) (e.g., output amps indicative of motor output), brake operation amount/pressure (B), battery SOC (i.e., the charged amount for battery 44 detected by a system on chip (SOC) sensor). Sensors 52 can also detect a gas pedal position, brake pedal position, and steering wheel position (e.g., an angle from a neutral steering wheel position). Accordingly, vehicle 10 can include a plurality of sensors 52 that can be used to detect various conditions internal or external to the vehicle and provide sensed conditions to engine control unit 50 (which, again, may be implemented as one or a plurality of individual control circuits). In various embodiments, sensors 52 may be included to detect one or more conditions directly or indirectly such as, for example, fuel efficiency ($E_F$), motor efficiency ($E_{MG}$), hybrid (internal combustion engine 14+MG 12) efficiency, acceleration ($A_{CC}$), etc. Sensors 52 may also be included to detect one or more conductions, such as brake pedal actuation and position, accelerator pedal actuation and position, and steering wheel angle, to name a few.

Additionally, one or more sensors 52 can be configured to detect, and/or sense position and orientation changes of the vehicle 10, such as, for example, based on inertial acceleration, trajectory, and so on. In one or more arrangements, electronic control unit 50 can obtain signals from vehicle sensor(s) including accelerometers, one or more gyroscopes, an inertial measurement unit (IMU), a dead-reckoning system, a global navigation satellite system (GNSS), a global positioning system (GPS), a navigation system, and/or other suitable sensors. In one or more arrangements, electronic control unit 50 receives signals from a speedometer to determine a current speed of the vehicle 10.

In some embodiments, one or more of the sensors 52 may include their own processing capability to compute the results for additional information that can be provided to electronic control unit 50. In other embodiments, one or more sensors may be data-gathering-only sensors that provide only raw data to electronic control unit 50. In further embodiments, hybrid sensors may be included that provide a combination of raw data and processed data to electronic control unit 50. Sensors 52 may provide an analog output or a digital output. Additionally, as alluded to above, the one or more sensors 52 can be configured to detect, and/or sense in real-time. As used herein, the term "real-time" means a level of processing responsiveness that a user or system senses as sufficiently immediate for a particular process or determination to be made, or that enables the processor to keep up with some external process.

Sensors 52 may be included to detect not only vehicle conditions and dynamics but also to detect external conditions as well, for example, contextual information of the surrounding environmental conditions. Sensors that might be used to detect external conditions can include, for example, sonar, radar, lidar or other vehicle proximity sensors, and cameras or other image sensors. Such sensors can be used to detect, for example, traffic signs indicating a current speed limit, road curvature, road type, obstacles (e.g., other surrounding vehicles and objects), space gaps with obstacles, weather, time of day, road type, road surface conditions, and a traffic conditions, and so on. Still other sensors may include those that can detect road grade. While some sensors can be used to actively detect passive environmental objects, other sensors can be included and used to detect active objects such as those objects used to implement smart roadways that may actively transmit and/or receive data or other information.

Accordingly, the one or more sensors 52 can be configured to acquire, and/or sense external environmental conditions. For example, environment sensors can be configured to detect, quantify and/or sense objects in at least a portion of the external environment of the vehicle 10 and/or information/data about such objects. Such objects can be stationary objects and/or dynamic objects. Further, the sensors 52 can be configured to detect, measure, quantify and/or sense other things in the external environment of the vehicle 10, such as, for example, lane markers, signs, traffic lights, traffic signs, lane lines, crosswalks, curbs proximate the vehicle 10, off-road objects, etc.

Sensors 52 may be included to detect not only external conditions but also to detect internal conditions as well, for example, contextual information of the environmental conditions inside the cabin of the vehicle, for example, in-cabin conditions. Sensors that might be used to detect in-cabin conditions can include, for example, sonar, radar, lidar or other proximity sensors, and cameras or other image sensors. Such sensors can be used to detect, for example, occupants of the vehicle; head status (e.g., head position or facing direction) of occupants, such as a driver; eye status (e.g., open/closed status, eye position, and eye movement) of occupants, such as the driver; and so on.

Accordingly, the one or more sensors 52 can be configured to acquire, and/or sense in-cabin conditions. For example, in-cabin sensors can be configured to detect, quantify and/or sense objects and status in at least a portion of the cabin of the vehicle 10 and/or information/data about such objects. Such objects can be stationary objects and/or dynamic objects.

The detected data discussed herein may be included as vehicle-related data. For example, sensors 52 may acquire internal vehicle information, external environment data, in-vehicle operating conditions and dynamics, or any other information described herein. In some examples, sensors 52 may generate the vehicle-related data and/or other vehicle systems illustrated in FIG. 3 may receive the data from sensors 52 to generate the vehicle-related data.

Figure 3:
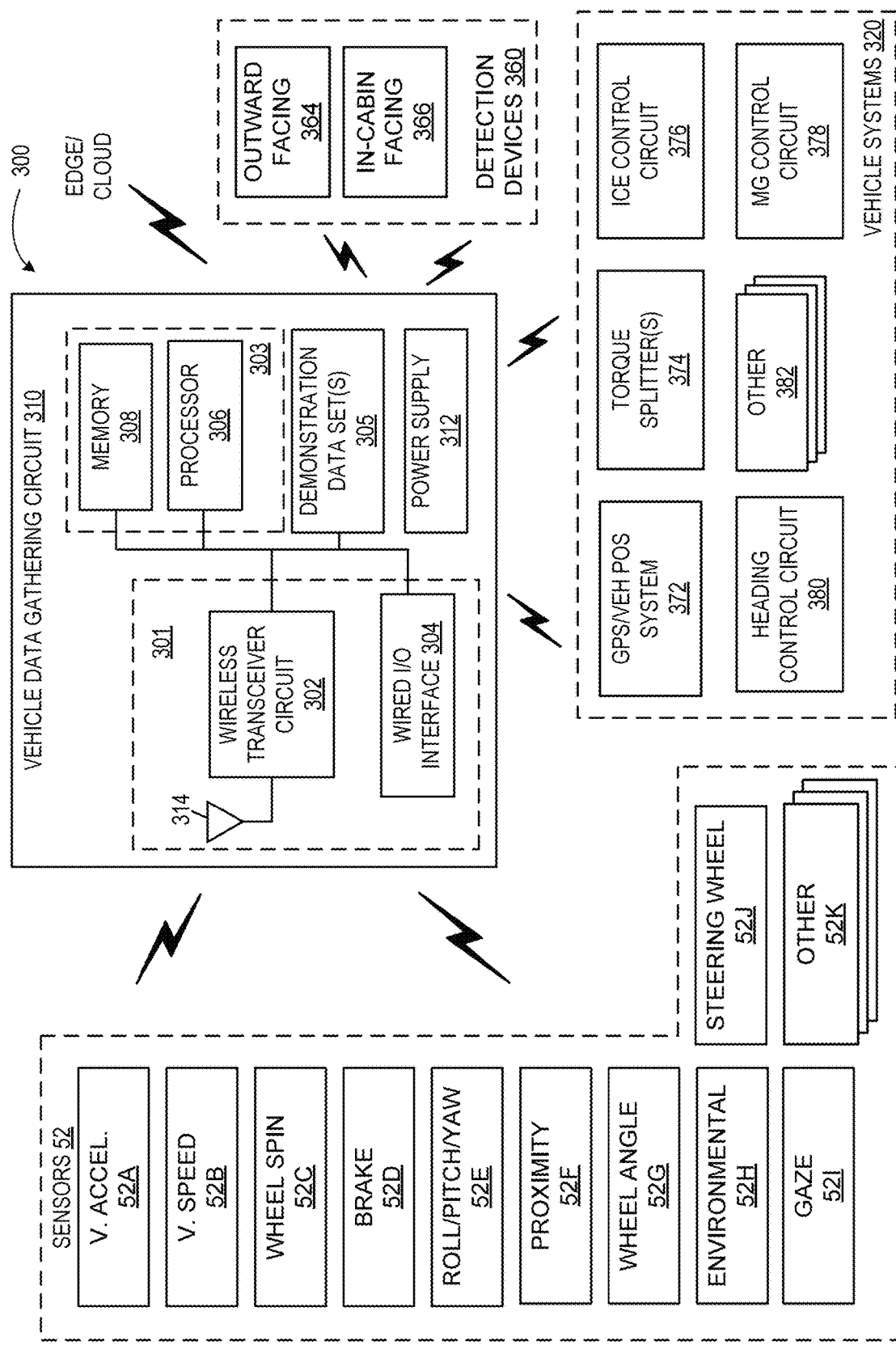
FIG. 3 illustrates an example architecture for predictive perception assessment in accordance with embodiments of the systems and methods described herein.

FIG. 3 illustrates an example architecture for predictive perception assessment in accordance with embodiments of the systems and methods described herein. In this example, vehicle 300 comprises vehicle data gathering circuit 310, a plurality of sensors 52, and one or more vehicle systems 320. Vehicle 300 is an example implementation of vehicle 10 of FIG. 1. Sensors 52 and vehicle systems 320 can communicate with vehicle data gathering circuit 310 via a wired or wireless communication interface. Although sensors 52 and vehicle systems 320 are depicted as communicating with vehicle data gathering circuit 310, they can also communicate with each other as well and with other vehicle systems. Vehicle data gathering circuit 310 can be implemented as an ECU or as part of an ECU such as, for example ECU 50. In other embodiments, vehicle data gathering circuit 310 can be implemented independently of an ECU.

Vehicle data gathering circuit 310, in this example, includes a communication circuit 301, a decision circuit 303 (including a processor 306 and memory 308 in this example) and a power supply 312. Components of vehicle data gathering circuit 310 are illustrated as communicating with each other via a data bus, although other communication in interfaces can be included.

Processor 306 can include a GPU, CPU, microprocessor, or any other suitable processing system. Memory 308 may include one or more various forms of memory or data storage (e.g., flash, RAM, etc.) that may be used to store the calibration parameters, images (analysis or historic), point parameters, instructions and variables for processor 306 as well as any other suitable information. Memory 308 can be made up of one or more modules of one or more different types of memory and may be configured to store data and other information as well as operational instructions that may be used by the processor 306 to control vehicle data gathering circuit 310.

Although the example of FIG. 3 is illustrated using processor and memory circuitry, as described below with reference to circuits disclosed herein, decision circuit 303 can be implemented utilizing any form of circuitry including, for example, hardware, software, or a combination thereof. By way of further example, one or more processors, controllers, ASICs, PLAs, PALs, CPLDs, FPGAs, logical components, software routines or other mechanisms might be implemented to make up vehicle data gathering circuit 310.

Communication circuit 301 may be either or both a wireless transceiver circuit 302 with an associated antenna 314 and a wired I/O interface 304 with an associated hardwired data port (not illustrated). Communication circuit 301 can provide for V2X, V2I, and/or V2V communications capabilities, allowing vehicle data gathering circuit 310 to communicate with roadside equipment or infrastructure (e.g., RUS 104 of FIG. 1), network cloud devices (e.g., cloud servers 110 of FIG. 1), and/or other vehicles (e.g., vehicles 102A and/or 102B).

As this example illustrates, communications with vehicle data gathering circuit 310 can include either or both wired and wireless communications circuits 301. Wireless transceiver circuit 302 can include a transmitter and a receiver (not shown) to allow wireless communications via any of a number of communication protocols such as, for example, WiFi, Bluetooth, near field communications (NFC), Zigbee, and any of a number of other wireless communication protocols whether standardized, proprietary, open, point-to-point, networked or otherwise. Antenna 314 is coupled to wireless transceiver circuit 302 and is used by wireless transceiver circuit 302 to transmit radio signals wirelessly to wireless equipment with which it is connected and to receive radio signals as well. These RF signals can include information of almost any sort that is sent or received by vehicle data gathering circuit 310 to/from other entities such as sensors 52 and vehicle systems 320.

Wired I/O interface 304 can include a transmitter and a receiver (not shown) for hardwired communications with other devices. For example, wired I/O interface 304 can provide a hardwired interface to other components, including sensors 52 and vehicle systems 320. Wired I/O interface 304 can communicate with other devices using Ethernet or any of a number of other wired communication protocols whether standardized, proprietary, open, point-to-point, networked or otherwise.

Power supply 310 can include one or more of a battery or batteries (such as, e.g., Li-ion, Li-Polymer, NiMH, NiCd, NiZn, and NiH2, to name a few, whether rechargeable or primary batteries,), a power connector (e.g., to connect to vehicle supplied power, etc.), an energy harvester (e.g., solar cells, piezoelectric system, etc.), or it can include any other suitable power supply.

Sensors 52 can include, for example, those described above with reference to the example of FIG. 1. Sensors 52 can include additional sensors that may or not otherwise be included on a standard vehicle with which the predictive perception assessment system is implemented. In the illustrated example, sensors 52 include operational sensors, for example, sensors to detect engine operating characteristics (e.g., fuel flow, RPM, oxygen flow, engine oil temperature, and so on); sensors to detect vehicle operating characteristics (e.g., steering input sensors such as a steering wheel encoder, brake sensors to detect the amount of braking applied, sensors to detect the amount of throttle/accelerator input, and so on) and sensor to detect vehicle dynamics (e.g., accelerometers to detect vehicle roll, pitch and yaw, accelerometers to detect wheel displacement, and so on).

For example, as shown in FIG. 3, sensors 52 may include operational sensors, such as but not limited to, vehicle accelerator sensors 52A to detect accelerator pedal actuation and/or pedal position (e.g., an amount of throttle input), vehicle speed sensors 52B to detect vehicle speed, wheel-spin sensors 52C (e.g., one for each wheel), brake sensor 52D to detect brake pedal actuation and/or to pedal position (e.g., an amount of braking input), accelerometers such as a 3-axis accelerometer 52E to detect roll, pitch, and yaw of the vehicle (e.g., to detect vehicle heading), wheel angle sensor 52G to detect an angle of the wheel 34; and steering wheel sensor 52J to detect an position (e.g., angle) of the steering wheel 54.

Sensors 52 may also include sensors to detect external characteristics of the vehicle surroundings. External environmental condition sensors may be included to detect distance and distance changes to external objects (e.g., distance to other vehicles, ground clearance, distance to external objects, and so on); temperature, pressure and humidity sensors to detect weather conditions; and other sensors to detect other external conditions. Image sensors can be used to detect, for example, the presence of lanes (e.g. by detecting lines in the road, curbing, medians, etc.), traffic signs, road curvature, obstacles, and so on. For example, as shown in FIG. 3, sensors 52 include external condition sensors, such as but not limited to, proximity sensors 52E to detect and recognize objects and features in surrounding proximate to the vehicle and environmental sensors 52H to detect external environmental conditions.

The external environmental condition sensor may include or otherwise communicably coupled to (e.g., via wired or wireless communications via communication circuit 301) to image capturing and/or range detecting devices, such as but not limited to, cameras; radar, lidar, sonar, infrared sensors, to name a few. For example, as illustrated in FIG. 3, vehicle 300 includes detection devices 360, which may include outward facing image/ranging devices 364 to collect data of the surroundings external to the vehicle. For example, device 364 may comprise a plurality of image sensors and/or range detecting sensors situated throughout vehicle 300 and facing outward toward the external environment. In the case of image sensors, devices 364 capture image frames as data which may be used to detect and recognize objects and features surrounding the vehicle 300, for example, through application of object and feature recognition techniques.

Sensors 52 may also include sensors to detect internal conditions of the vehicle, for example, in the vehicle cabin (e.g., in-cabin). Internal environmental condition sensors may be included to detect objects and occupants present in the cabin (e.g., driver, occupants in front and/or rear seats, etc.); movement of occupants and extremities thereof; and other sensors to detect other internal conditions. For example, as shown in FIG. 3, sensors 52 include internal condition sensors, such as but not limited to, gaze sensors 52I to detect status (e.g., open or closed in the case of eyes) and positions of an occupant's head and eyes (e.g., for head and eye tracking and gaze direction estimation).

The internal condition sensors may include or otherwise communicably coupled to (e.g., via wired or wireless communications via communication circuit 301) to image capturing and/or range detecting devices, such as but not limited to, cameras; radar, lidar, sonar, infrared sensors, to name a few. For example, the detection devices 360 may also include in-cabin image/ranging devices 366 to collect data of the conditions inside the cabin of the vehicle. For example, devices 366 may be similar to devices 364, but directed inward toward the inside of the vehicle cabin. Such devices may be position in an instrument panel, center stack, headliner, pillars, or anywhere within the cabin of the vehicle. Devices 366 data which may be used to detect and recognize objects and features inside the cabin, for example, through application of object and feature recognition techniques. For example, devices 366 may be used to detect a head of an occupant and/or eyes of an occupant. The data collected by devices 366 may be used to determine head and eye positions and track head and eye movement over a time period. In some embodiments, gaze sensor 52I may include devices 366, while in others devices 366 may be communicably coupled (e.g., via communication circuit 301) to gaze sensor 32I.

While the preceding described various example sensors. Embodiments herein are not limited to only those sensors described, additional sensors 52L can also be included as may be appropriate for a given implementation of vehicle 300. Furthermore, vehicle systems 320 may also provide vehicle-related data relevant to vehicle operation, characteristics, and dynamics to the vehicle data gathering circuit 310. For example, operation states of vehicle 300 (e.g., motor, engine, wheel angle, etc.) used by vehicle systems 320 may be supplied as vehicle-related data and/or used in conjunction with data collected by sensors 52.

Vehicle systems 320 can include any of a number of different vehicle components or subsystems used to control or monitor various aspects of the vehicle and its performance. In this example, the vehicle systems 320 include a global positioning system (GPS) or other vehicle positioning system 372; torque splitters 374 that can control distribution of power among the vehicle wheels such as, for example, by controlling front/rear and left/right torque split; engine control circuits 376 to control the operation of engine (e.g. Internal combustion engine 14); motor control circuits 378 to control operation of motor/generator (e.g., motor 32); heading control circuits 380 to control the direction of travel (e.g., the angle of wheels 34 and/or steering wheel 54); and other vehicle systems 382 (e.g., Advanced Driver-Assistance Systems (ADAS), such as forward/rear collision detection and warning systems, pedestrian detection systems, and the like).

As alluded to above, vehicle systems 320 may also provide vehicle-related data relevant to vehicle operation, characteristics, and dynamics to the vehicle data gathering circuit 310. For example, vehicle position system 372 may supply positional information; heading control circuit 380 may supply heading direction information; an ADAS system may supply hazard (e.g., obstacles, pedestrians, vehicles, etc.) detection; and the like. In some examples, data from the vehicle systems 320 may be used to derive vehicle-related data, for example, position and heading from vehicle systems 320 may be used to determine trajectory data.

Vehicle data gathering circuit 310, by way of communication circuit 301, can receive data from various vehicle sensors 52 and/or vehicle systems 320 (as well as V2I and V2V communications) regarding vehicle operating information (e.g., data), external environmental information, and/or in-cabin information (collectively referred to as vehicle-related data). Upon receipt of the aforementioned data and/or information, the data/information may be stored in memory 308, e.g., in a cache or buffer portion of memory 308. Decision circuit 303 may access memory 308 to analyze the received data/information to determine what data/information should be retained and/or transmitted to cloud devices, e.g., a cloud server to train an AI model.

For example, decision circuit 303 receives vehicle-related data from sensors 52 and/or vehicle systems 302 and stores the received information as demonstration data set(s) 305 for transmission to the cloud. The sensors 52 may be sampled at any desired sampling rate while the vehicle is manually operated by a driver, for example, sensors 52 collect data every 1/100 of a second and are provided to the vehicle data gathering circuit 310 at the same rate. Each instance of sampling of vehicle-related data may be grouped together as a demonstration, for example, based on a timestamp at which point the sampling of the vehicle-related data occurred. Any sampling rate may be used as desired, as long as the rate is high enough to capture the dynamics of the target object. For example, a sampling rate of the speed and acceleration can be set to 10 Hz; the sampling rate of the gaze detector might need to be higher than 10 Hz; the sampling rate of the environmental factors (weather, road type) can be much lower than 10 Hz. It should also be appreciated that different sensors can have different sampling rates, and the data gathering circuit 310 may be configured for data synchronization amongst the different sensors. Data from different sensors are time series data. Therefore, the time series data should be synchronized and gathered based on respective timestamp. Additionally, every demonstration may be separated based on a change of the event (e.g., road type change, obstacle reaction, vehicle status change, weather change, etc.). A collection of demonstrations within a determined time window while vehicle is manually operated by the driver may be representative of the driving style and/or behavior of that driver. The machine learning algorithms used herein may not require a large amount of data. However, the data requirement may be dependent on the complexity of the learning behavior. Accordingly, in various embodiments, 10 demonstrations may be sufficient for simple driving behaviors, such as vehicle-following. In some implementations, the demonstration data set(s) 305, for a respective driver, may be associated with a driver identifier for that driver. The driver identifier may be received by the vehicle data gathering circuit 310, for example, via driver input (e.g., into a touchscreen or other input device) upon turning on the vehicle, communicated the vehicle data gathering circuit 310 via a key fob used to unlock the vehicle (e.g., storing the identifier), or otherwise communicated to the vehicle data gathering circuit 310. In some embodiments, driver identification can be high-dimensional. User login may be necessary, for example, through username and passwords, biometric solutions (e.g., fingerprint scanners, face detection, iris recognition, and son one), etc.

The vehicle data gathering circuit 310, via communication circuit 301, communicates the demonstration data set(s) 305 to the cloud. As will be described below, AI techniques can be applied to the demonstration data set(s) to learn a digital twin model for the driver associated with the demonstration data set(s). Subsequent demonstration data (e.g., current vehicle-related data) for the driver may be input into the digital twin model as observations. The subsequent demonstration data may be supplied in real-time as the most recent vehicle-related data. From the model, with the subsequent demonstrations as current stats, actions (e.g., vehicle operating inputs) can be inferred that, when input into vehicle systems 302, may operate the vehicle in a manner that optimally or nearly optimally mimics the drivers personal driving style and behavior.

In various embodiments, communication circuit 301 can be used to send control signals to various vehicle systems 320 as part of controlling the operation of the vehicle, for example, based on application of the digital twin model on a current observation. For example, communication circuit 301 can be used to send vehicle operation inputs as signals to, for example, one or more of: motor controllers 376 to, for example, control motor torque, motor speed of the various motors in the system to control acceleration and/or declaration of the vehicle according to the control policy; ICE control circuit 376 to, for example, control power to engine 14 to, for example, to control acceleration and/or declaration of the vehicle according to the control policy; and/or brake pedal actuation, for example, to decelerate the vehicle according to the control policy. Thus, in various embodiments, control of the vehicle systems 320 according to the control policy maintains a vehicle-following distance between vehicle 10 and a lead vehicle in accordance with the calculated control policy. In some embodiments, the communication circuit 301 can be also used to send signals to, for example, the heading control circuit 380 to control a steering angle of the wheels 34 to control vehicle heading, for example, in a case where the control policy controls the vehicle in autonomous operation mode.

The decision regarding what action to take via the various vehicle systems 320 can be made based on the information detected by sensors 52. For example, proximity sensor 52F may detect a lead vehicle at a distance from the vehicle 10. Decision circuit 303 may determine, based on application of the digital twin model that that the following distance should be increased so as to align with historical vehicle-following behavior of the driver. The communication circuit 301 may communicate control signals from the decision circuit 308 to control deceleration of the vehicle (e.g., reduce power output from engine 14, reduce motor speed of motor 32, and/or brake pedal actuation) to achieve a following distance according to the control policy. Similarly, the following distance may be reduced, lane-keeping may be maintained, navigation/heading control may be determined according to the digital twin model to mimic driving styles and behaviors of the driver.

The focus of a person's gaze on an object or feature may be representative of where a person's attention is focused. The focus of a person's gaze may be derived, for example, from status of the person's eyes and head. For example, the direction the eyes are looking and/or direction the head is facing may indicate a direction of the focus. Additionally, along with the direction, the position of the gaze may then be derived by tracing the direction to an intercepting object.

In-cabin sensors (e.g., devices 366 and/or gaze sensor 52I of FIG. 3) may be used to detect an occupant's (e.g., the driver's) head and eyes, for example, through known object and feature recognition techniques. The status of the head and eyes may be determined from the recognition, for example, whether one or both eyes are open or closed. Head position and eye position may be tracked, and gaze directions determined therefrom. For example, where both eyes are open, a vector from each eye may be traced and where the vectors intersect may be a point of focus. For head tracking, a direction may be derived from extending a vector orthogonally from a virtual plane of the person's face. Where the eye and head vectors converge may represent the gaze direction and position. In the case of one eye being closed, the gaze may be based on a vector from one eye and the head. This gaze may represent a position at which the driver's attention is focused.

The use of eye, head, and/or gaze position may be used to detect potential eye disease and visual impairments. For example, eye movement analysis may be used for identification of ocular disease, as well as mental and neural disorder such as autism spectrum disorder, attention deficit hyperactivity disorder (ADHD), and Parkinson's disease. Additionally, gaze position may be used to detect whether a person is distracted, for example, where the gaze position deviates from an expected position (e.g., deviation from a moving direction of a vehicle). Furthermore, eye status (e.g., open or closed) may be used to detect irritation of the eye that may distract a person (e.g., sunscreen, object, sunlight, infection, etc. in the eye).

Figure 4:
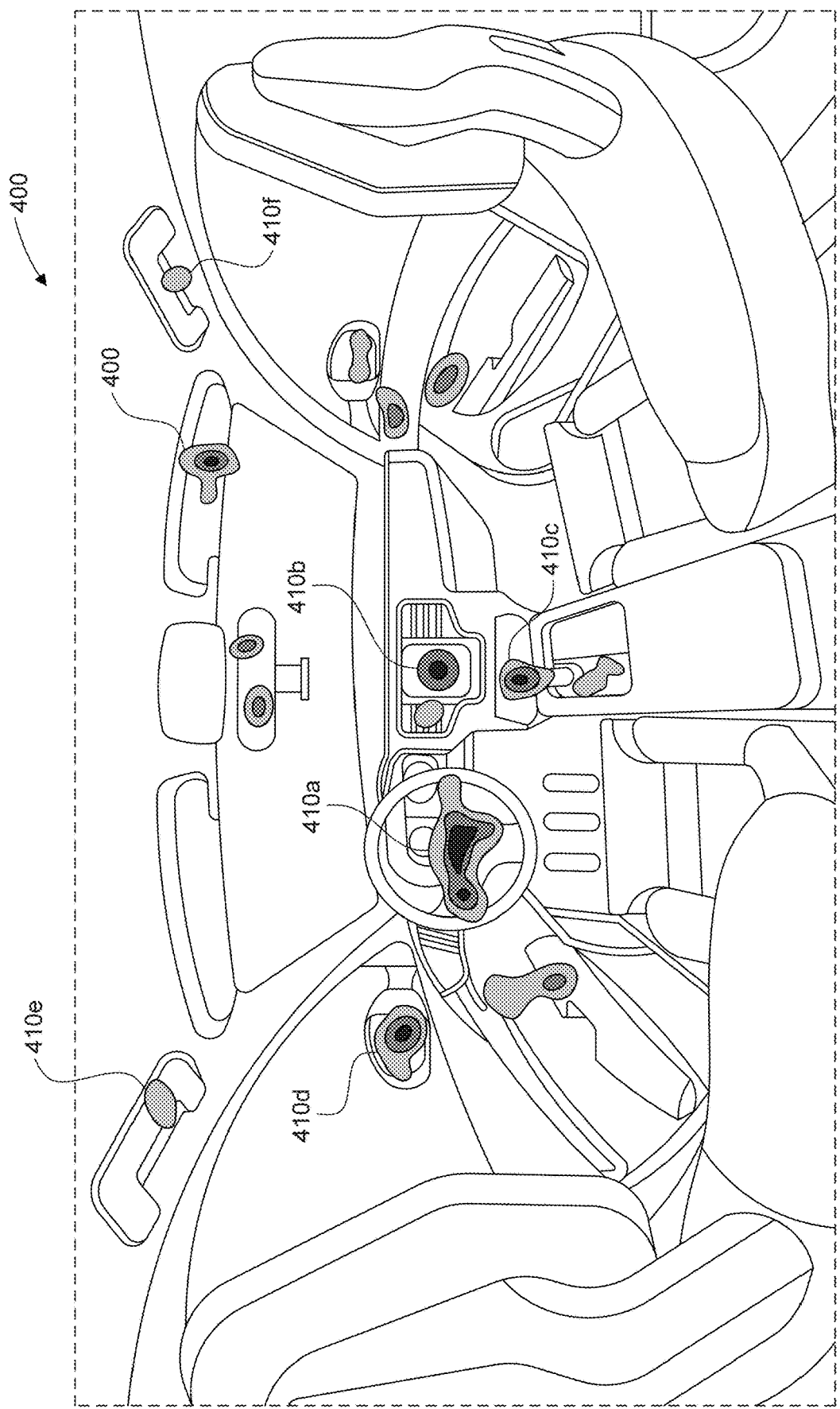
FIG. 4 is an example illustration of a heatmap of gaze position for a driver from inside of vehicle.

FIG. 4 is an example illustration of a heatmap of gaze position for a driver from inside of vehicle (e.g., vehicle 10 of FIG. 1 and/or vehicle 300 of FIG. 3). FIG. 4 shows an illustration of a vehicle cabin 400, which may be the cabin of vehicle 10 of FIG. 1. A plurality of hot spots 410a-n are shown in grey scale based on frequency, e.g., the amount of time a driver's gaze is focused on each respective location within the cabin, the number of instances that the driver's gaze is directed to or focused on a particular object or point, etc. The gaze position may be detected by one or more in-cabin sensors, for example, devices 366 and/or gaze sensor 52I of FIG. 1. For the ease of illustrations, proper gaze directions (e.g., in the vehicle traveling direction) are removed.

Darker hotspots indicate a greater number of instances and time that the driver's gaze was focused on the underlying location. For example, in FIG. 4, hotspot 410a is the darkest, which indicates the driver focused on the center of the steering wheel more often than other positions within the cabin 400. Similarly, the driver focused on the display at hotspot 410b, the gear shifter at hotspot 410c, and the driver side mirror at hotspot 410d almost as much as the steering wheel. Alternatively, the driver focused minimally at driver side handle at hotspot 410e and passenger side handle at hotspot 410f.

Figure 5:
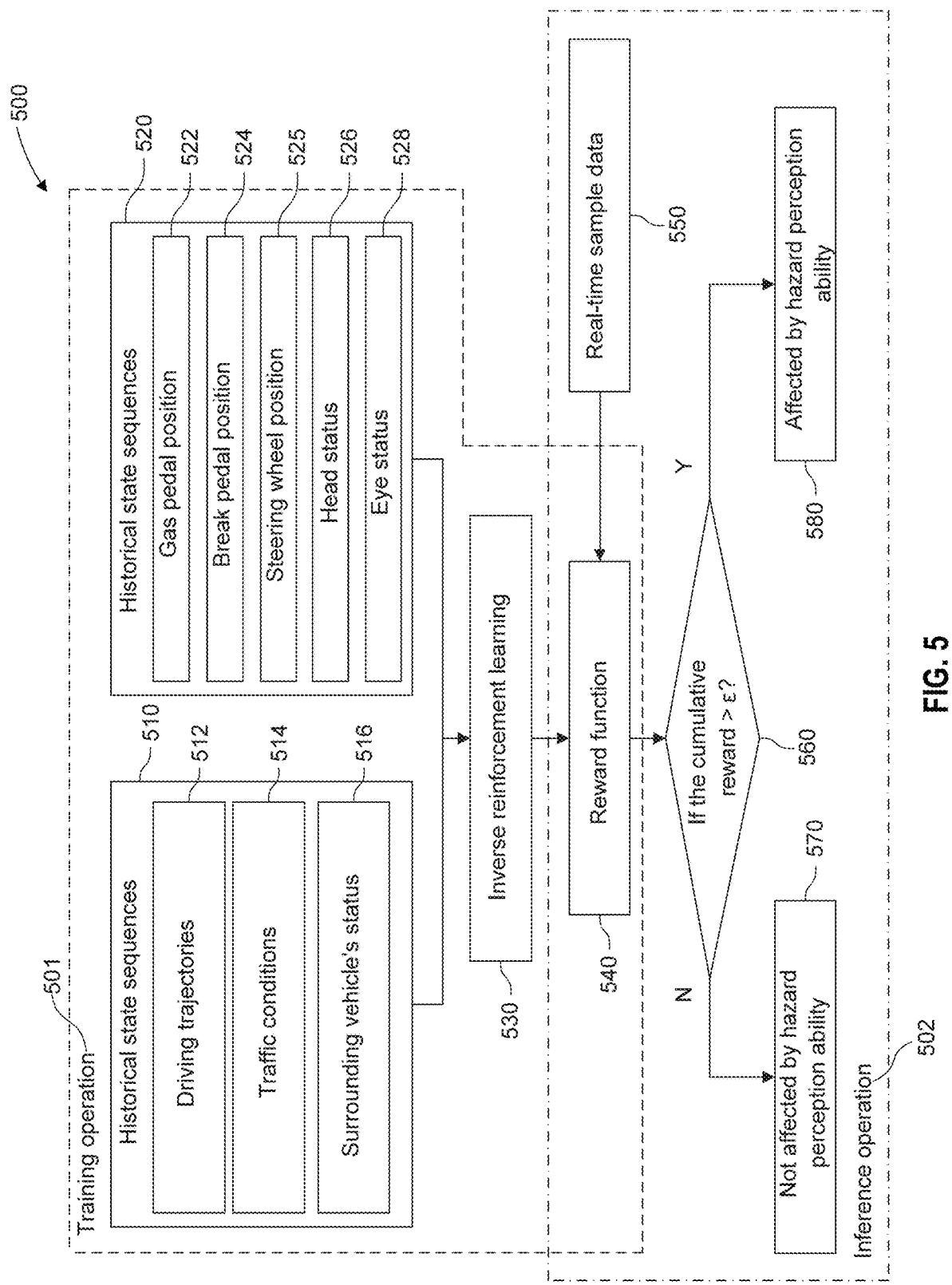
FIG. 5 is a flow chart illustrating example operations that can be performed by predictive perception assessment systems and methods in accordance with embodiments of the present disclosure.

FIG. 5 is a flow chart illustrating example operations that can be performed by predictive perception assessment systems and methods in accordance with embodiments of the present disclosure. The operations illustrated in FIG. 5 and described herein can be performed by, for example, one or more server(s), such cloud server 110 of FIG. 1 or other computing components or systems resident on a network. In some embodiments, one or more operations may be performed by, or based on performance by the vehicle data gathering circuit 300 of FIG. 3.

The operations of illustrated in FIG. 5 include a training operation 501 and an inference operation 502, which may also be referred to as a perception assessment operation.

During the training operation 501, at operations 510 and 520, external and internal vehicle-related data, respectively, is received, for example, while a vehicle is manually operated by a driver. Vehicle-related data collected in operations 510 and 520 may be considered historical vehicle-related data. The vehicle-related data received at operations 510 and 520 may be received by, for example, cloud sever 110 and stored, for example, in cloud-based database 112.

Internal and external vehicle-related data may be collected at the vehicle, for example, by sensors 52 of vehicle 300, by vehicles systems 320, by V2V communications with other vehicles, and/or V2I communications from roadside equipment and/or infrastructure, as described above. The vehicle-related data may then be communicated to a server (e.g., cloud server 110) over a network via V2X communications. In some embodiments, operations 510 and 520 may be receive at a set transmission/reception rate, which may be any rate desired based on the application. In some embodiments, vehicle-related data may be received as it is collected, for example, as vehicle-related data is stored as demonstration data set(s) 305 and transmitted in a serial manner (e.g., as each demonstration is collected it is transmitted to the cloud). In another example, vehicle-related data is stored as demonstrations data set(s) 305 and transmitted as a block of demonstration data sets. In some embodiments, the vehicle-related data may be stored with timestamps and then associated, either on vehicle or in the cloud, with other vehicle-related data so to group the data into a set of demonstration that is based on the timestamp. For example, timestamps that fall within a set time frame (e.g., 1 second, 5 second, etc.) may be considered as a single demonstration and associated together.

Additionally, operations 510 and 520 may include receiving vehicle-related data along with an associated driver identifier, for example, as described above. The vehicle-related data may be stored in the database (e.g., cloud-based database 112) according to the driver identifier. In this way, vehicle-related data from a plurality of drivers may be received and separately associated with the proper driver. Thus, vehicle-related data for each driver may be used to learn a corresponding digital twin model for that specific driver.

Operation 510 may include sub-operations 512-616. At operation 512, driving trajectories of the vehicle are received and/or calculated. For example, geographic location information may be collected, for example, by vehicle positioning system 372, and the position may be tracked over a number of positions while traveling. The position may be sampled at set times, such that the direction of travel and speed of travel may be calculated and supplied as a trajectory. Additionally, trajectory may be determined based on vehicle speed, for example, from vehicle speed sensors 52B, and heading information, for example, from the heading control circuit 380 and/or accelerometer 52E.

At operation 514, traffic conditions of the vehicle are received. Traffic conditions may be collected at the vehicle based on V2V and/or V2I communications reporting traffic conditions ahead of and surrounding the vehicle. Additionally, traffic conditions may be collected by proximity sensor 52F, environmental sensors 52H, and outward facing devices 364. Furthermore, the GPS system 372 may report traffic conditions either to the vehicle over V2X communications and/or directly to the cloud.

At operation 516, status of surrounding vehicles (e.g., speed, acceleration, maneuvering, etc.) are received (e.g., vehicles 102A and 102B of FIG. 1). Status of surrounding vehicles may be collected at the vehicle based on V2V and/or V2I communications reporting status of surrounding the vehicles. Additionally, such status may be collected by proximity sensor 52F, environmental sensors 52H, and outward facing devices 364.

Operation 520 may also include sub-operations 522-528. For example, operation 522 includes receiving gas pedal position information, for example, from the vehicle accelerator sensor 52A. Operation 524 includes receiving brake pedal position information, for example, from the brake sensor 52D. Operation 525 includes receiving steering wheel position information, for example, from the steering wheel sensor 52J or derived from the wheel angle sensor 52G. Such information, when combined with trajectory information, traffic conditions, and surrounding vehicle status information may represent historical demonstrations of driving style and behavior under the various conditions.

Other conditions may also be used to determine driving behavior. For example, vehicle acceleration, speed, and heading may be used in a manner similar to the accelerator/ brake pedal positions and steering wheel information. Additionally, other external conditions, such as weather, time of day, vehicle type, road condition, road type, etc., may be used as well.

At operations 526 and 528, the head status and eye status are received. For example, head status and eye status in the form of eye and head tracking data (e.g., from in-cabin facing device 366 and/or gaze sensors 52I) maybe received. In some embodiments, eye and head tracking information is received, which may then be used to determine statuses (e.g., closed or open) and gaze position within the cabin, as explained above. Open or closed eye status may be recognized, for example, through object and feature recognition techniques known in the art. In another example, eye and head status and gaze direction may be determined on-board the vehicle and then communicated to the cloud. As described above, the gaze position may represent a position at which the driver's attention is focused and deviation from an expected position may represent distraction or an vision impairment (e.g., disease, irritation, etc.) affecting the driver's ability to perceive hazards in the traveling pathway.

At operation 530, historical vehicle-related data (e.g., historical demonstration data set(s)) are retrieved from storage (e.g., cloud-based database) and used with AI techniques to train a digital twin model. For example, various embodiments herein apply inverse reinforcement learning (IRL) to the historical vehicle-related data from operations 510 and 520 to learn a digital twin model corresponding to the driving style and behaviors of the driver. The digital twin model may be a reward function that can be applied to observed states (e.g., a current demonstration) to infer actions as to how a driver will behave during the current demonstration. Accordingly, IRL is used in various embodiments herein to learn the driver's driving preference from historical behavior (e.g., historical demonstrations). Inclusion of eye and head status teaches the digital twin model on expected head and eye behaviors while driver, and can be used to identify whether the driver is affected by perception ability, or simply gets distracted while driving.

For example, driving behavior of a given driver may be represented as a sequential decision process of a rational agent. This sequential decision process can be modeled using a Markov Decision Process (MDP). Formally, an MDP is defined as:

$$\mathcal{M} = \{ \mathcal{S}, \mathcal{A}, T(a,t), R_\theta(s,a;\theta)\} \quad \text{Eq. 1}$$

where $\mathcal{S}$ is a state space of states s an agent can visit; $\mathcal{A}$ is a set of actions a that the driver may perform, T is a transition function representing how actions move an agent from one state to the next state; and R is an instantaneous reward function of given action a at state s parameterized by parameterization factor $\theta$.

The MDP is used in various embodiments to describe the personalized driving activity in different traffic scenario, for example, as defined based on the vehicle-related data. For example, states may include driving trajectory (e.g., operation 512), traffic condition (e.g., operation 514), and the status of the surrounding vehicles (e.g., operation 516). Actions may include the driver's maneuvering, for example, gas pedal position (e.g., operation 522), brake pedal position (e.g., operation 524), and steering wheel position (e.g., operation 525), and the driver's attention, for example, head status (e.g., operation 526), and eyes status (e.g., operation 528).

Personal driving style and behavior can be described as a reward function of the state space, where the driver usually performs optimal or near optimal in terms of a cumulative reward of the reward function over time. That is to say, if the driver is not affected by hazard perception ability, a (s, $\alpha$)$_t$ sequence should have a high score in terms of the following equation:

$$V(\xi) = \sum_{t=0}^{N} \gamma^t \cdot R_\theta(s, a; \theta) \quad \text{Eq. 2}$$

where $\xi$ is a sample demonstration; $\gamma$ is a discount factor; and $R_\theta$(s,a; $\theta$) is the reward function as a function of states s and actions a parameterized by $\theta$. The value V represents the cumulative reward over time 0 to N, where N is the set time window. The length of N may depend on the length of the event and the sample rate.

During training operation 501, IRL is applied at operation 530 to recover the reward function of the driver by calculating the parameters $\theta$ based on the historical vehicle-related data as inputs into the IRL. The recovered reward function is then stored, for example, in cloud-based database 112, associated with the driver identifier at operation 540.

During the inference operation 502, the cumulative reward V($\xi$) can be calculated based on sample demonstrations to assess current performance of the driver in terms of the personal driving style, for example, the reward function stored at operation 540. Sample demonstrations may include similar information as the historical demonstrations, for example, a sample trajectory, traffic conditions, and surrounding vehicle status and driver's actions.

For example, at operation 550, real-tome demonstrations are received as current vehicle-related data is received, for example, in while the vehicle is manually operated. For example, vehicle-related data at operation 550 may be received in real time, such that the received data is the most recent demonstration(s) of the conditions in which the vehicle is operating. Vehicle-related data received at operation 550 may be the same and/or similar types of data as receive at operations 510 and 520. Additionally, vehicle-related data at operation 550 may be received in the same manner as that of operations 510 and 520 described above.

The trained digital twin model (e.g., from operation 530) is retrieved from storage, for example, by locating the model associated with the driver identified included with the vehicle-related data from operation 530. The digital twin model may be the reward function recovered by application of IRL. From the retrieved reward function, the cumulative reward is calculated (e.g., Eq. 2 above) using the current vehicle-related data from operation 550 as inputs, at operation 540. The time window N may define the time frame of real-time demonstrations, for example, most-recent vehicle related data sampled within a time window N may be used to calculate the cumulative reward.

At operation 560, the cumulative reward is compared to a threshold cumulative reward (E). The threshold may be set based on the desired application and stringency of the assessment being performed. If calculated cumulative score is less than the threshold, operation 580 is performed and a notification is issued reporting that the driver's perception ability is impaired. For example, the cloud sever 112 communicates a notification to the vehicle over a V2X communication, which the vehicle reports to the driver (e.g., via a display, instrument panel, haptic feedback, audio, etc.). In some embodiments, alone or in combination with the vehicle to driver notification, the cloud sever 112 communicates a notification to the vehicle over a V2X communication and the vehicle enters an autonomous or semi-autonomous operational mode (e.g., takes control from the driver to ensure safety of the driver and surroundings). Additional example implementations are described below in connection with FIGS. 7-9.

Figure 6:
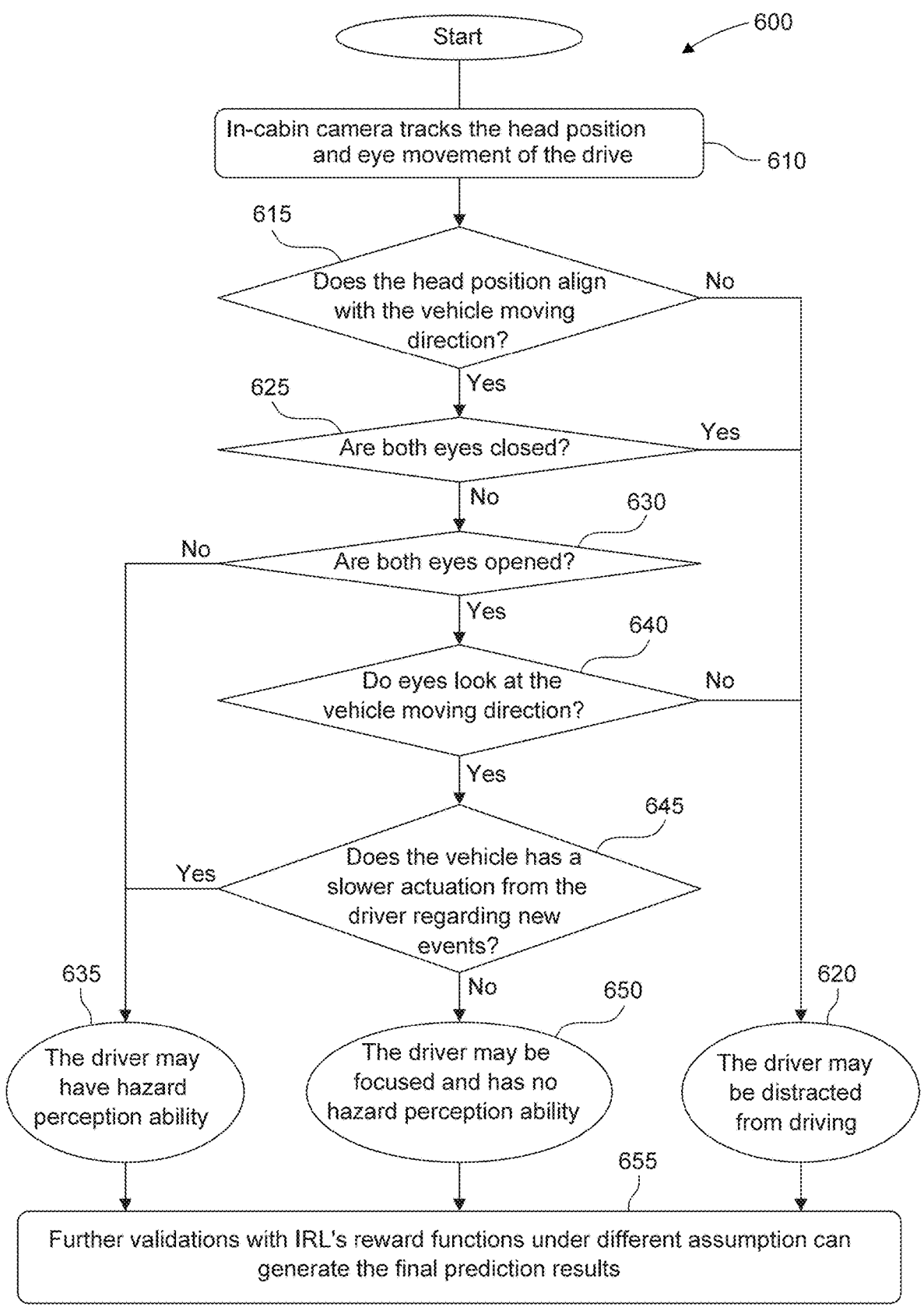
FIG. 6 is a flow chart illustrating example process that can be performed to predict perception ability of a driver in accordance with embodiments of the present disclosure.

FIG. 6 is a flow chart illustrating example process that can be performed to predict perception ability of a driver in accordance with embodiments of the present disclosure. The process illustrated in FIG. 6 and described herein can be performed as instructions stored in a memory executed by, for example, one or more server(s), such cloud server 110 of FIG. 1 or other computing components or systems resident on a network. In some embodiments, the process of FIG. 6 may be performed by, for example, the vehicle data gathering circuit 300 of FIG. 3.

At block 610, vehicle-related data is used to track head position and eye movement of an occupant of the vehicle (e.g., the driver). For example, as described above, in-cabin facing cameras (e.g., in-cabin devices 366 of FIG. 3) detect objects in the vehicle and recognize a head and eyes of the driver. The position and movements of the head and eyes are tracked by, for example, by the in-cabin facing devices 366 and/or gaze sensors 52I to determine positions.

At block 615, a determination is made as to whether or not the head position aligns or nearly aligns with the vehicle moving direction. For example, for a given sampling of the in-cabin cameras (e.g., an image frame or a collection of image frames within a time window), the head position is determined. For the same time window (e.g., based on timestamps), the vehicle moving direction is determined, for example, based on trajectory information, such as derived from vehicle-related data as described above. From this, block 615 checks if the head position aligns or nearly aligns with the moving direction, for example, the head facing direction is parallel or approximately parallel with the moving direction.

If no, the process proceeds to block 620 and generates an indication that the driver may be distracted from driving. At block 655, the indication is forwarded for further validation with the reward function (e.g., operation 540) under current assumptions (e.g., current observed demonstration), for example, where the indication is based on and included as current vehicle-related data (e.g., operation 550). For example, FIG. 5 illustrates a validation process that uses a personalized driver behavior model (e.g., the digital twin model) trained according to the process of FIG. 6, that is output at block 655. Process 600 defines a process (e.g., a logic tree) that screens out invalid events based on selected features such as eye status and reaction time. In another example, the indication may be based on and included as historical vehicle-related data (e.g., used in training an IRL according to FIG. 5 above), in which case the reward function may be trained to in view of the indication with corresponding vehicle conditions.

If the determination at block 615 is yes, then at block 625 a determination is made as to whether both eyes are closed, for example, from data collected by the in-cabin facing devices 366 and/or gaze sensors 52I. If yes, the process proceeds to block 620. Otherwise, at block 630 a determination is made as to whether both eyes are open, for example, from data collected by the in-cabin facing devices 366 and/or gaze sensors 52I.

If the determination at block 635 is no, the process proceeds to block 635 and generates an indication that the drivers ability to perceive hazards is impaired. As described above, the indication from block 635 is forwarded for further validation with the reward function (e.g., operation 540) under different assumptions at block 656. Additionally, as noted above, the indication may be based on and included as historical vehicle-related data, in which case the reward function may be trained to in view of the indication with corresponding vehicle conditions.

If the determination at block 30 is yes, at block 640 a determination is made as to whether or not the eyes are aligned or nearly aligned with the vehicle moving direction. For example, the direction of the eyes maybe determined by determining the gaze direction as described above. Block 640 can confirm if the eye direction aligns or nearly aligns with the moving direction, for example, the eye direction is parallel or approximately parallel with the moving direction. If the determination at block 640 is no, the process proceeds to block 620, which proceeds as described above. Otherwise, the process proceeds to block 645.

At block 645, a determination is made as to whether or not the reaction time of the driver to a new event (e.g., new hazard or obstacle) is slower than an expected reaction time. For example, block 645 may determine that time it took for the driver to actuate the brake pedal (e.g., via brake sensors 52D) in the event of a perceived hazard (e.g., as detected by the proximity sensors 52F and/or environmental sensors 52H) is below a threshold. For example, the reaction time of the driver is compared with a digital twin model of a driver with no ocular ailment and is based on the drivers ability to gauge and react to a hazard. In various embodiments, the threshold may be a determined value that can be stored onboard. In one example, the threshold may be determined based on tests conducted by the manufacturer that examines a driver's reaction time to a new event and screens out the events that have a very low chance to be visual impairment. For example, increases in consistency of heavy braking may be a sign of reduced hazard perception, because such actions may be caused by a delayed reaction time. Where the increase occurrence of heavy braking may be detected based on applying the reward function to recognize a change in driving behavior that indicates a change in perception ability.

If block 645 determines that the drivers perception ability is impaired, the process proceeds to block 635. Otherwise, the process proceeds to block 650 where an indication is generated that indicates the driver may be focused on the moving direction and has no perception ability impairment. The indication is then forwarded to block 655, which proceeds as described above.

Embodiments of the predictive perception assessment system described above can be used in multiple use cases. For example, the predictive perception assessment system may be used to recognize changes in the drivers perception ability over time (e.g., the ability of the driver to focus on objects), for example, due to age-related macular degeneration, ocular diseases, etc. As another example, the predictive perception assessment system may be used to detect a potential infectious disease breakout and alerting proper medical experts. In yet another example, the predictive perception assessment system may be used to predict temporary, non-disease or degeneration perception impairment (e.g., foreign objects or matter in the eyes such as sweat or sunscreen, temporary dry eyes, tears, etc.). In the preceding examples, the digital twin models (e.g., reward functions) may be applied to real-time vehicle-related data, including real-time eye and head status (e.g., FIG. 6) to predict deviations from optimal or nearly optimal driving behavior and recognize the deviation is a result of changes in perception ability of the driver.

Figure 7:
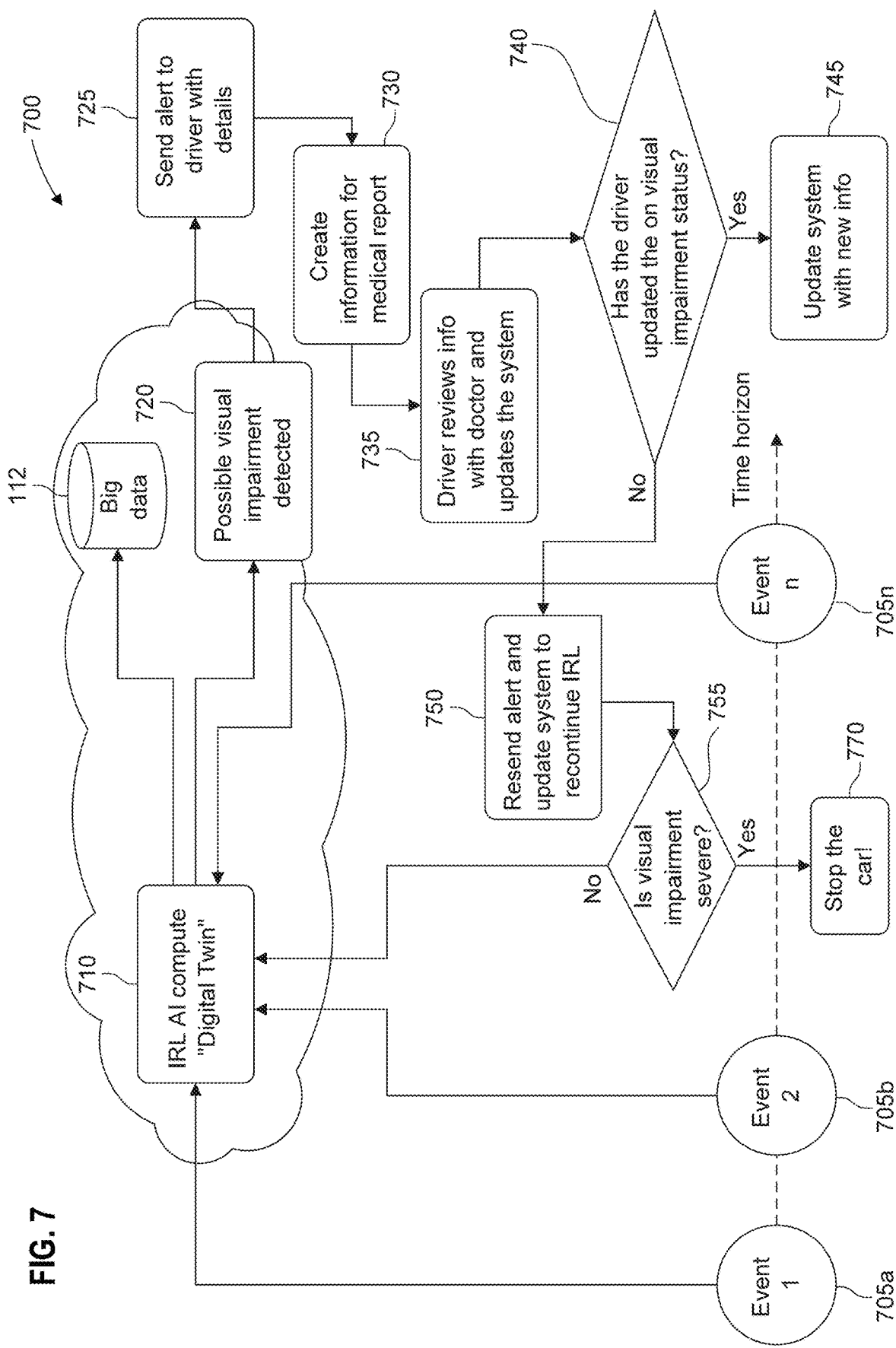
FIG. 7 is a flow chart illustrating an example application of the predictive perception assessment systems and methods according to embodiments of the present disclosure.

For example, FIG. 7 is a flow chart illustrating an example application of the predictive perception assessment systems and methods according to embodiments of the present disclosure. FIG. 7 illustrates a process 700 for detecting change in perception ability using the predictive perception assessment systems according to disclosed herein. Process 700 can be performed as instructions stored in a memory executed by, for example, one or more server(s), such cloud server 110 of FIG. 1 or other computing components or systems resident on a network. In some embodiments, one or more aspects of process 700 may be performed by, for example, a vehicle having a vehicle data gathering circuit (e.g., vehicle data gathering circuit 300 of FIG. 3) installed thereon.

Events 705a-n (collectively referred to herein as events 705) may be collected over time at a vehicle (e.g., vehicle 10), for example, by a vehicle data gather circuit (vehicle data gather circuit 300 of FIG. 3). Each event 705 may be representative of an observed demonstration (e.g., demonstration data set(s) 305), and communicated to the cloud (e.g., cloud server 110 and cloud-base database 112, as described above). As described above, each event 705 may include a driver identifier, so that each event is stored in an associative manner with the other events for that driver and for the purpose of retrieving the corresponding digital twin model.

At block 710, one or more events 705, corresponding to the driver, are received at the cloud and AI techniques (e.g., IRL) are applied to teach a digital twin model on driving behavior and styles of the driver for which the events 705 are received. A cloud server applies IRL to one or more of events 705 as historical demonstrations to learn the digital twin model of the driver, for example, as described above in connection to FIGS. 5 and 6.

Events 705 may be received in real-time from the vehicle. At the point in time a respective even 705 is received, the event 705 may be used as a current or real-time demonstration (e.g., operation 550 of FIG. 5) to which the learned digital twin model is applied, for example, as described in connection with FIGS. 5 and 6. When new events are received, previous events may then be used as historical vehicle-related data. Through application over time, changes in driver behavior can be tracked.

For example, each event 705 may be initiated based on detecting a hazardous event, for example, by one or more sensors 52 (e.g., proximity sensors 52F, environmental sensors 52H, etc.) and/or vehicle systems 320 (e.g., object on road, activation of forward collision warning by a ADAS, pedestrian warning system of the ADAS, or any hazard detected by the vehicle). In response to detecting a hazardous event, vehicle-related data is collected as a demonstration and applied to the digital twin model. For example, perception ability prediction process (e.g., FIG. 6) is applied to determine if the driver was distracted or perception ability is impaired. The determination is then validated with application of a predictive perception assessment system (e.g., FIG. 5). The resulting cumulative reward calculated from the digital twin model is then checked against a threshold cumulative reward. As described in connection with FIG. 5, if the cumulative reward is equal to or less than the threshold, then the driver is not affected by the ability to perceive hazards.

Otherwise, process 700 proceeds to block 720 where an indication of possible visual impairment is detected. The indication is sent as an alert to the driver at block 725. The indication may an auditory, visual, haptic, etc. generated in the vehicle for an immediate warning. The indication may also be provided, alone or in combination, as an e-mail, text or other communication method via a user device (e.g., computer, wearable device, mobile device, etc.) of the driver. The process 700 also generates information, including the indication, as a medical report, at block 730. The medical report is communicated to the driver, who is instructed to consult with a medical expert (e.g., doctor) to have the driver's eye sight examined. Blocks 730 and 725 may be performed at the same time or one after the other.

At block 740, a determination is made as to whether the driver has updated the predictive perception assessment system with visual impairment status (if any) based on the medical report. If yes, at block 745, the system is updated and IRL is performed using the updated information as a state in the historical demonstrations, thereby updating the digital twin model accordingly. If the determination at block 740 is no, the predictive perception assessment system issues another alert at block 750, for example, through the vehicle and/or electronic communication via the user device of the driver.

At block, 755, the predictive perception assessment system determines whether the visual impairment is severe, for example, by applying a second threshold to a cumulative reward calculated in view of the updated information. The another threshold may be lower (e.g., more stringent) than the cumulative reward threshold based on an determined acceptable level of severity in visual impairment. If the determination at block 755 is yes, the vehicle is stopped and/or otherwise locked (e.g., through semi-autonomous vehicle control) from being driven by the driver at block 760. In some embodiments, blocks 755 and 760 may be performed as part of block 745 as well, for example, where the driver updated the information in the system.

Accordingly, process 700 uses the digital twin model to assess an track driver perception ability over multiple events 705 over time. Through recalculating the cumulative reward from the digital twin model for each event and updating the digital twin model over time, perception ability over time may be tracked for degeneration and/or onset of disease impacting the driver's ability to perceive hazards.

Figure 8:
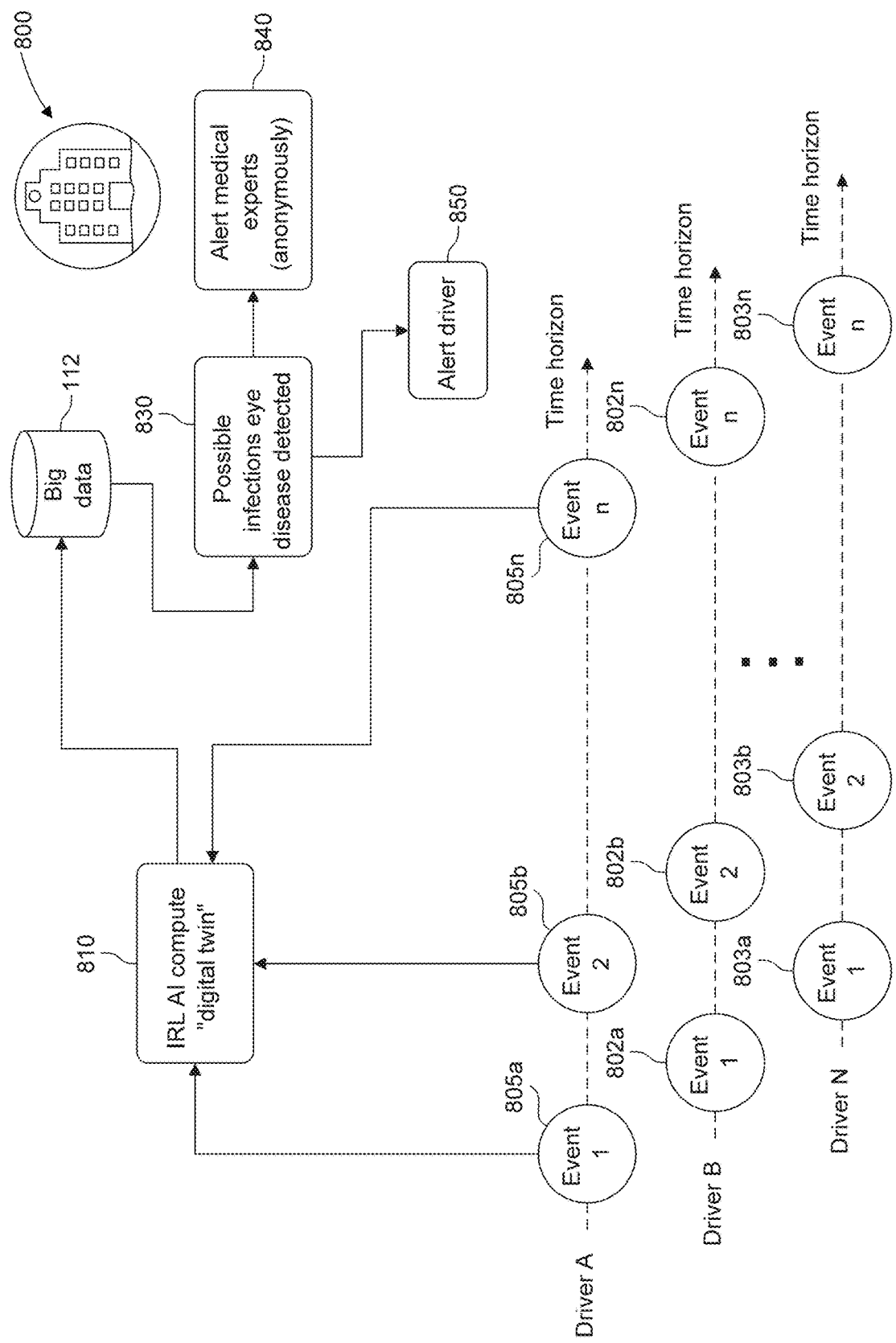
FIG. 8 is a flow chart illustrating another example application of the predictive perception assessment systems and methods according to embodiments of the present disclosure.

FIG. 8 is a flow chart illustrating another example application of the predictive perception assessment systems and methods according to embodiments of the present disclosure. FIG. 8 illustrates a process 800 for detecting a potential infectious disease breakout using the predictive perception assessment systems disclosed herein. As with process 700, process 800 can be performed as instructions stored in a memory executed by, for example, one or more server(s), such cloud server 110 of FIG. 1 or other computing components or systems resident on a network. In some embodiments, one or more aspects of process 800 may be performed by, for example, a vehicle having a vehicle data gathering circuit (e.g., vehicle data gathering circuit 300 of FIG. 3) installed thereon.

At block 810, events are received from a plurality of drivers. For example, as shown in FIG. 8, events 805a-n (collectively referred to herein as events 805) are collected at a vehicle operated by Driver A, events 802a-n (collectively referred to herein as events 802) are collected at a vehicle operated by Driver B, and events 803a-n (collectively referred to herein as events 803) are collected at a vehicle operated by Driver N. Each event 802, 803, and 805 may be similar to events 705 described above in connection with FIG. 7. That is, each event may represent a demonstration collected by a corresponding vehicle and communicated to the cloud for use in the predictive perception assessment system and storage in cloud-based database 112.

Also at block 810, a digital twin model is learned for each driver based on the received events, for example, according to FIGS. 5 and 6. For example, a digital twin model is learned for Driver A from events 805, a digital twin model is learned for Driver B from events 802, and so on. The digital twin models are stored in the database 112 associated with each respective driver, and may be used, for example, in performing predictive assessments as described in FIG. 5 and in FIG. 7.

Additionally, through collection of information from a plurality of drivers, process 800 can generate predictive analytics of potential diseases (for example, disease impacting vision) based on the collection of data across numerous drivers (e.g., big data). Information is received from numerous drivers (e.g., millions), across different driving styles, different demographics, different geographic regions, and health records (if available). By leveraging the big data and different data sets, process 800 may be able to predict whether a particular driver is at risk of a infections disease, for example, based on real driving behavior and analysis by the cloud server.

For example, changes in driving behavior of drivers within a certain geographic region may indicate a commonly experienced impairment (e.g., a potential disease experienced by a number of drivers). This information may be reported to other drivers and/or medical experts to whether a potential outbreak in the area. Each person is different. A 90+ year old may have no visual impairment, while a 70-year-old may have some eye disease. Comparing data from similar type of drivers and the actual driving styles of the particular driver, process 800 may predict whether or not someone maybe seeing the onset of visual impairment and alerts the driver to do a medical checkup. It could be a trivial matter or potentially becoming serious. Through the use of in-cabin sensors along with digital twin models based on real driving behavior, embodiments herein can offer predictive analytics.

For example, as noted above, driving behavior of a plurality of drives may be tracked at block 810 (e.g., FIGS. 5 and 6). Comparison of changes in driving behavior of drivers having historically similar driving styles may be performed. Where the changes in driving behavior are the same or similar across a set of similar drivers, a possible infectious diseases may be detected, at block 830. Similarly, a plurality of driver types may be examined such that multiple groupings may provide further insight into the presence of a possible disease. In response to the detection at block 830, alerts and analytics can be offered to the driver (block 850), such as auditory, visual, haptic in vehicle and/or via a user device. Also, an alert may be issued (anonymously) to health professionals (block 850), who can track infections or potential infections in the area and provide warnings and early interventions as needed.

In another example, embodiments herein may provide for a real time temporary perception impairment assessment prediction. In some cases, an object or foreign matter may enter the eyes of a driver while operating a vehicle, which may cause a temporary impairment of perception ability. For example, sweat, dirt, sunscreen, etc. may enter into the eyes causing irritation that the driver may respond to by closing the eyes and/or wiping the eyes with a hand or towel. Some drivers who wear prescription glasses may take their glasses off to wipe away the sweat and/or dirt from their eyes, causing reduced perception ability. Some drivers may even drive with one eye shut if the irritation is only in one eye. Such situations are potential safety hazards. Embodiments disclosed herein can be implemented to predict a situation where a temporary eye status (e.g., as described above) may cause a hazardous driving situation, for example, by using in-cabin sensors (e.g., cameras and other in-cabin tracking devices) and a historical vehicle-related data, for example, a frequency of cleaning eyes while driving or driving with one eye shut. Embodiments herein may detect a hazardous situation and activate enters an autonomous or semi-autonomous operational modes that may slow down the vehicle, operate the vehicle, and/or park the vehicle on the side of the road.

Figure 9:
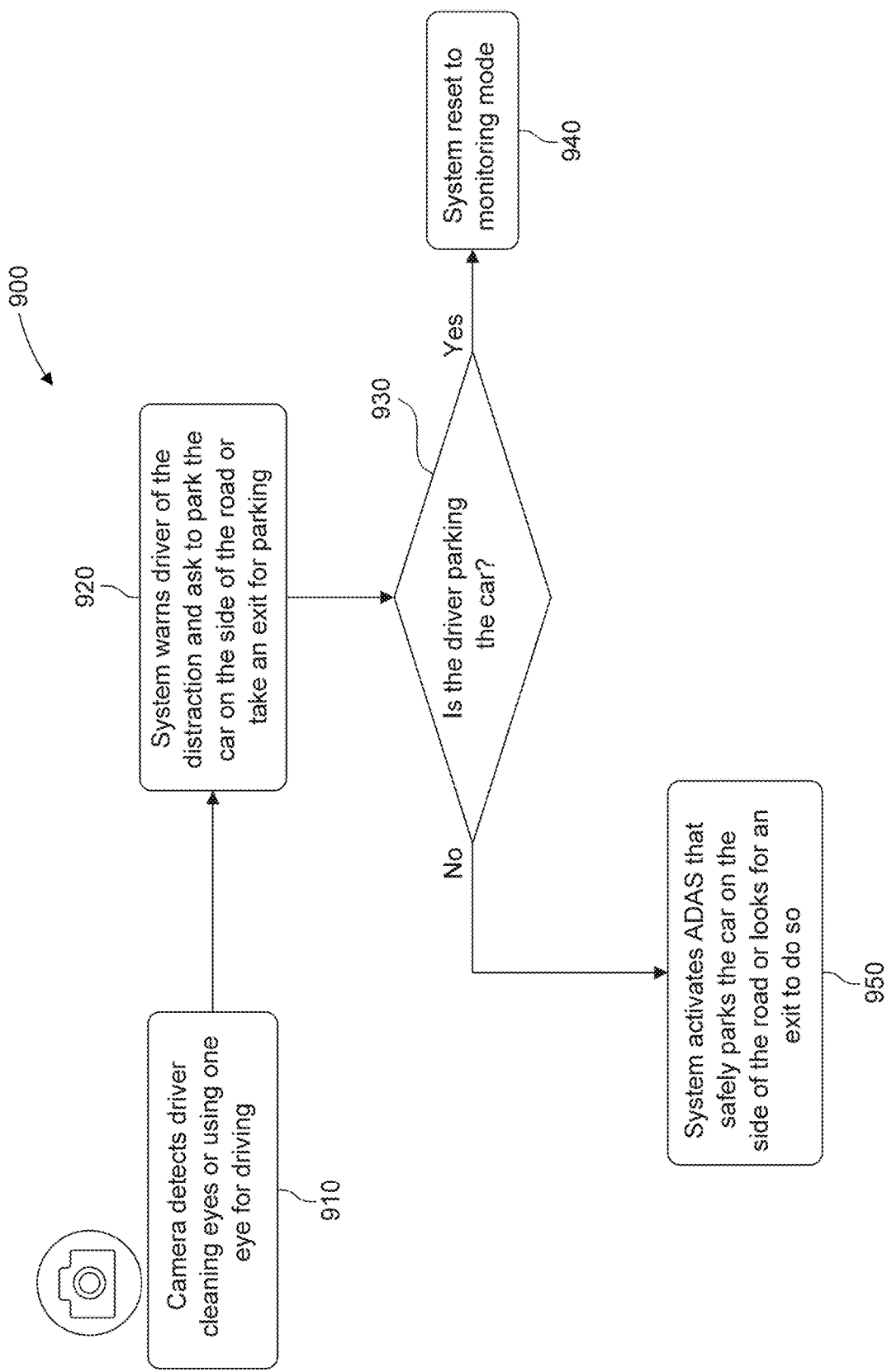
FIG. 9 is a flow chart illustrating yet another example application of the predictive perception assessment systems and methods according to embodiments of the present disclosure

FIG. 9 is a flow chart illustrating an example process to predict temporary perception impairment in accordance with embodiments of the present disclosure. FIG. 9 illustrates a process 900 for detecting a temporary impairments of a driver's ability to perceive hazards using the predictive perception assessment systems disclosed herein. As with process 700 and 800, process 900 can be performed as instructions stored in a memory executed by, for example, one or more server(s), such cloud server 110 of FIG. 1 or other computing components or systems resident on a network. In some embodiments, one or more aspects of process 800 may be performed by, for example, a vehicle having a vehicle data gathering circuit (e.g., vehicle data gathering circuit 300 of FIG. 3) installed thereon.

At block 910, the process detects a potential perception impairment of the driver. For example, in-cabin sensors (e.g., in-cabin facing device 366 and/or gaze sensors 52I) may track eye and head movements and execute a perception ability prediction process (e.g., FIG. 6) to determine an eye and head status. For example, from the process of FIG. 6, a determination can be made that one or both eyes are closed or that the driver is not focused in the moving direction (e.g., head or eye position indicates the driver is focused on something else). In some embodiments, the in-cabin sensors may recognize hand or body movements (e.g., through object recognition and tracking techniques) indicating that the driver is wiping or otherwise cleaning his/her eyes.

At block 910, the detection result may be applied to a digital twin model, as described above, to determine whether the detected potential impairment is aligned with the driver's driving style and behavior. For example, a current demonstration including the potential impairment may be input into the digital twin model to calculate a cumulative reward. If the cumulative reward is below a threshold, for example, based on a cumulative reward without the potential impairment according to the drivers historical driving behavior, the process may determine that the driver's perception ability temporarily impaired. The historical driving behavior (e.g., historical demonstrations) may include a frequency and scenarios in which the driver tends to close his/her eyes and/or looks away from the moving direction. An increase in the frequency of doing so in the current demonstration may indicate the temporary impairment. Block 910 may be performed in the cloud, for example, based on one or more received current demonstrations and the detection communicated to the vehicle, or may be performed on-board the vehicle (e.g., decision circuit 303 of FIG. 3) by downloading the digital twin model from the cloud.

Based on the determination at block 910, the process issues a warning to the driver, for example, an auditory, visual, or haptic warning generated by the vehicle based on a the detection at block 910. The vehicle may also generate a notification to operate the vehicle according to a safety protocol, for example, by instructing the driver to stop the vehicle (e.g., park the vehicle) and/or take an exit to locate a safe place to stop.

At block 930, a determination is made as to whether the vehicle has been stopped, for example, based on data from sensors 52. If the vehicle is stopped, at block 940 the process is reset to monitoring the in-cabin sensors for future events. Otherwise, at block 950, an autonomous or semi-autonomous operational mode may be activated (e.g., without driver input and/or acknowledgement) and the vehicle autonomously controlled so to stop at a safe location. For example, an ADAS system may be activated that controls the vehicle through self-driving and parking operations. Once stopped, the process may be reset for monitoring for future events.

While the processes discussed above in connection to FIGS. 7-9 are described separately, embodiments herein are not so limited. The processes of FIGS. 7-9 may be performed separately or in combination. For example, processes 700 and 800 may be performed at the same time (or about the same time), for example, using the same or similar data and digital twin models of a respective driver. Similarly, process 900 may be performed with processes 700 and 800.

Figure 10:
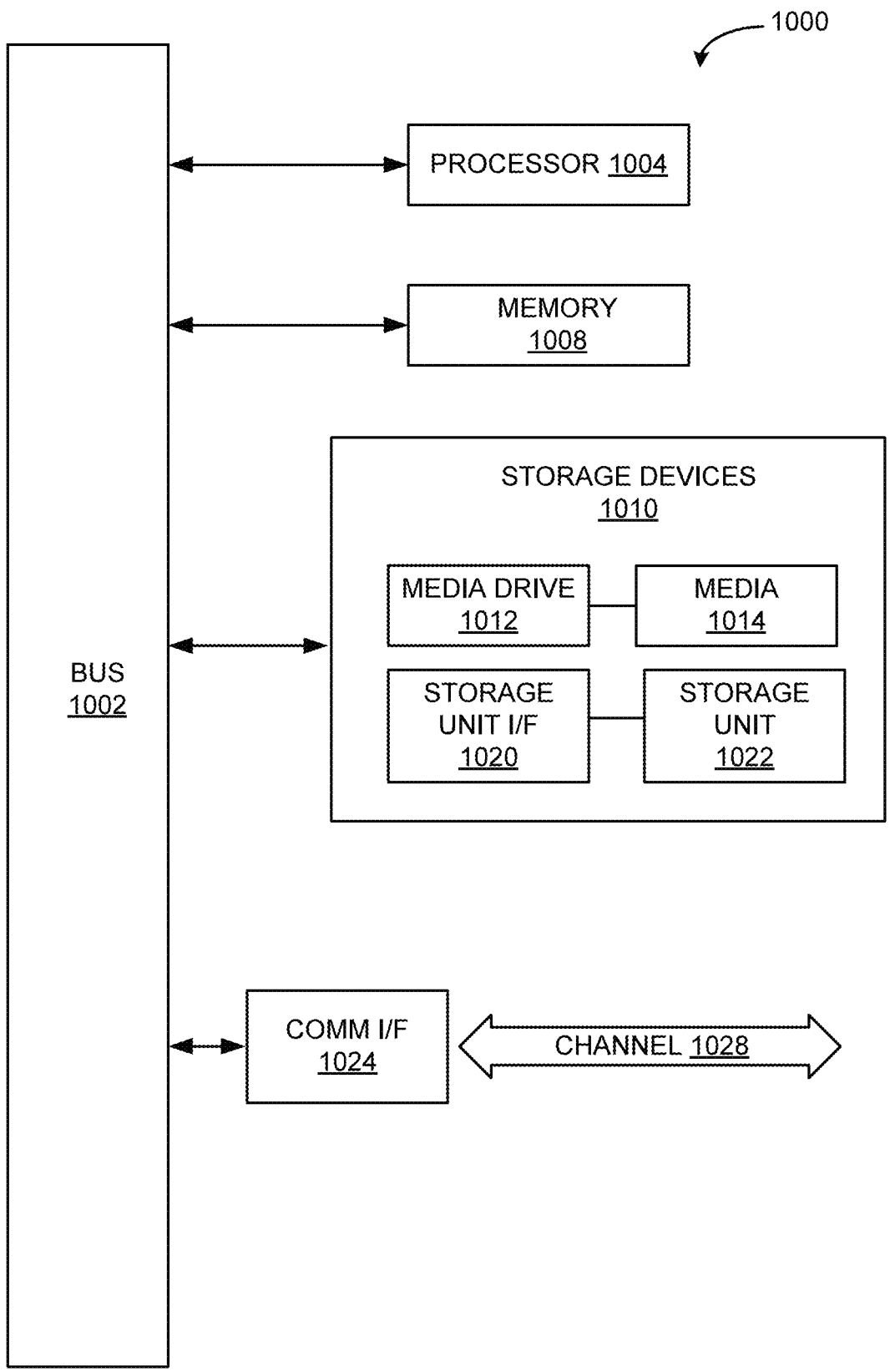
FIG. 10 is an example computing component that may be used to implement various features of embodiments described in the present disclosure.

As used herein, the terms circuit and component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 10. Various embodiments are described in terms of this example—computing component 1000. After reading this description, it will become apparent to a person skilled in the relevant art how to implement the application using other computing components or architectures.

Referring now to FIG. 10, computing component 1000 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 1000 might also represent computing capabilities embedded within or otherwise available to a given device. For example, a computing component might be found in other electronic devices such as, for example, portable computing devices, and other electronic devices that might include some form of processing capability.

Computing component 1000 might include, for example, one or more processors, controllers, control components, or other processing devices. This can include a processor, and/or any one or more of the components making up the vehicle data gathering circuit 310 and cloud server 110. Processor 1004 might be implemented using a general-purpose or special-purpose processing engine such as, for example, a microprocessor, controller, or other control logic. Processor 1004 may be connected to a bus 1002. However, any communication medium can be used to facilitate interaction with other components of computing component 1000 or to communicate externally.

Computing component 1000 might also include one or more memory components, simply referred to herein as main memory 1008. For example, random access memory (RAM) or other dynamic memory, might be used for storing information and instructions to be executed by processor 1004. Main memory 1008 might also be used for storing temporary variables or other intermediate information during execution of instructions to be executed by processor 1004. Computing component 1000 might likewise include a read only memory ("ROM") or other static storage device coupled to bus 1002 for storing static information and instructions for processor 1004.

The computing component 1000 might also include one or more various forms of information storage mechanism 1010, which might include, for example, a media drive 1012 and a storage unit interface 1020. The media drive 1012 might include a drive or other mechanism to support fixed or removable storage media 1014. For example, a hard disk drive, a solid-state drive, a magnetic tape drive, an optical drive, a compact disc (CD) or digital video disc (DVD) drive (R or RW), or other removable or fixed media drive might be provided. Storage media 1014 might include, for example, a hard disk, an integrated circuit assembly, magnetic tape, cartridge, optical disk, a CD or DVD. Storage media 1014 may be any other fixed or removable medium that is read by, written to or accessed by media drive 1012. As these examples illustrate, the storage media 1014 can include a computer usable storage medium having stored therein computer software or data.

In alternative embodiments, information storage mechanism 1010 might include other similar instrumentalities for allowing computer programs or other instructions or data to be loaded into computing component 1000. Such instrumentalities might include, for example, a fixed or removable storage unit 1022 and an interface 1020. Examples of such storage units 1022 and interfaces 1020 can include a program cartridge and cartridge interface, a removable memory (for example, a flash memory or other removable memory component) and memory slot. Other examples may include a PCMCIA slot and card, and other fixed or removable storage units 1022 and interfaces 1020 that allow software and data to be transferred from storage unit 1022 to computing component 1000.

Computing component 1000 might also include a communications interface 1024. Communications interface 1024 might be used to allow software and data to be transferred between computing component 1000 and external devices. Examples of communications interface 1024 might include a modem or softmodem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 1024 may be carried on signals, which can be electronic, electromagnetic (which includes optical) or other signals capable of being exchanged by a given communications interface 1024. These signals might be provided to communications interface 1024 via a channel 1028. Channel 1028 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 1008, storage unit 1020, media 1014, and channel 1028. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 1000 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method comprising:
    receiving first vehicle operating data and associated first gaze data of a driver operating a vehicle, wherein the first vehicle operating data comprises first driving trajectory data;
    training a model for the driver based on the first vehicle operating data and the first gaze data, the model indicating driving behavior of the driver;
    receiving second vehicle operating data and associated second gaze data of the driver, wherein the second vehicle operating data comprises second driving trajectory data; and
    determining that an ability of the driver to perceive hazards is impaired based on: applying the model to, at least, the second driving trajectory data and associated second gaze data, and a determination that second gaze data is not aligned with the second trajectory data.

2. The method of claim 1, further comprising:
    applying inverse reinforcement learning (IRL) to the first vehicle operating data and the associated first gaze data,
    wherein training the model is based on the application of the IRL.

3. The method of claim 2, wherein the IRL infers a reward function based on observed demonstrations, wherein the first vehicle operating data and the associated first gaze data is the observed demonstrations and the reward function is the model.

4. The method of claim 3, further comprising:
    determining a cumulative reward from the model based on the second vehicle operating data and associated second gaze data; and
    determining the cumulative reward is less than a cumulative reward threshold,
    wherein determining that the ability of the driver to perceive hazards is impaired is responsive to the determination that the cumulative reward is less than a cumulative reward threshold.

5. The method of claim 1, wherein at least one of the first gaze data and second gaze data comprises one or more of a head status and an eye status of the driver.

6. The method of claim 1, wherein at least one of the first gaze data and second gaze data is based on data collected by in-cabin sensors of the vehicle.

7. The method of claim 1, wherein at least one of the first vehicle operating data and the first vehicle operating data comprises one or more of traffic condition data, surrounding vehicle status data, accelerator position data, brake position data, and steering wheel position data.

8. The method of claim 1, further comprising:
determining the driver is distracted responsive to at least one of: a determination that a head of the driver is not aligned with a moving direction of the vehicle; eyes of the driver are closed; and the eyes of the driver are not aligned with the moving direction; and
determining that the ability of the driver to perceive hazards is impaired responsive to at least one of: at least one eye of the driver is closed, and a reduced reaction time of the driver to a hazard, wherein the reduced reaction time is determined based on an application of the model to the second vehicle operating data and associated second gaze data.

9. The method of claim 1, further comprising:
activating at least one of an autonomous or semi-autonomous operation mode responsive to the determination that the ability of the driver to perceive hazards is impaired.

10. The method of claim 1, further comprising:
generating an alert to the driver that a perception ability of the driver is impaired.

11. The method of claim 1, further comprising:
receiving a plurality of first vehicle operating data and a plurality of associated first gaze data of a plurality of drivers operating a plurality of vehicles, wherein the first vehicle operating data and the associated first gaze data of the driver is comprised in the plurality of first vehicle operating data and the plurality of associated first gaze data;
for each of the plurality of drivers, training a plurality of models for a respective driver based on first vehicle operating data of the plurality of first vehicle operating data and first gaze data of the plurality of first gaze data of the respective driver, each model indicative of driving behavior of each respective driver;
receiving a plurality of second vehicle operating data and a plurality of associated second gaze data of the plurality of drivers, wherein the first vehicle operating data and the associated first gaze data of the driver is comprised in the plurality of first vehicle operating data and the plurality of associated first gaze data; and
determining that an ability of each of the plurality of drivers to perceive hazards is impaired based on applying each model to respective second vehicle operating data and respective associated second gaze data, wherein the determination the ability of each of the plurality of drivers to perceive hazards is impaired is indicative of a disease experienced by each of the plurality of drivers.

12. The method of claim 11, further comprising:
transmitting a notification of the disease to at least one of a medical expert and each of the plurality of drivers.

13. A system, comprising:
a memory; and
one or more processors that are configured to execute machine readable instructions stored in the memory for performing a method comprising:
receiving historical vehicle operating data and associated historical gaze data of a driver operating a vehicle;
learning a reward function based on application of inverse reinforcement learning (IRL) to the historical vehicle operating data and the historical gaze data;
calculating a cumulative reward from the reward function based on real-time vehicle operating data and associated real-time gaze data of the driver; and
determining that an ability of the driver to perceive hazards is impaired based on the cumulative reward.

14. The system of claim 13, wherein the reward function is representative of driving behavior of the driver.

15. The system of claim 13, wherein the method comprises:
determining the cumulative reward is less than a cumulative reward threshold,
wherein determining that the ability of the driver to perceive hazards is impaired is responsive to the determination that the cumulative reward is less than a cumulative reward threshold.

16. The system of claim 13, wherein at least one of the historical gaze data and real-time gaze data comprises one or more of a head status and an eye status of the driver.

17. The system of claim 13, wherein at least one of the historical gaze data and real-time gaze data is based on data collected by in-cabin sensors of the vehicle.

18. The system of claim 13, wherein at least one of the historical vehicle operating data and the real-time vehicle operating data comprises one or more of driving trajectory data, traffic condition data, surrounding vehicle status data, accelerator position data, brake position data, and steering wheel position data.

19. The system of claim 13, wherein the method comprises:
activating at least one of an autonomous or semi-autonomous operation mode responsive to the determination that the ability of the driver to perceive hazards is impaired.

20. The system of claim 13, wherein the method comprises:
generating an alert to the driver that the perception ability of the driver is impaired.

* * * * *